US012078334B2

(12) United States Patent
Warrick et al.

(10) Patent No.: US 12,078,334 B2
(45) Date of Patent: Sep. 3, 2024

(54) LUMINAIRE WITH GLARE CONTROL

(71) Applicant: Express Imaging Systems, LLC, Renton, WA (US)

(72) Inventors: Benjamin Eugene Warrick, Renton, WA (US); John Pimenta Prata, Seattle, WA (US); Donald Arthur Vendetti, Seattle, WA (US)

(73) Assignee: Express Imaging Systems, LLC, Renton, WA (US)

( * ) Notice: Subject to any disclaimer, the term of this patent is extended or adjusted under 35 U.S.C. 154(b) by 0 days.

(21) Appl. No.: 18/198,783

(22) Filed: May 17, 2023

(65) Prior Publication Data
US 2023/0375152 A1 Nov. 23, 2023

Related U.S. Application Data

(60) Provisional application No. 63/343,488, filed on May 18, 2022.

(51) Int. Cl.
| | |
|---|---|
| *F21V 3/02* | (2006.01) |
| *F21S 8/08* | (2006.01) |
| *F21V 5/00* | (2018.01) |
| *F21V 5/04* | (2006.01) |
| *F21V 11/00* | (2015.01) |
| *F21V 31/00* | (2006.01) |
| *F21W 131/103* | (2006.01) |
| *F21Y 115/10* | (2016.01) |
| *G02B 5/02* | (2006.01) |
| *G02B 19/00* | (2006.01) |

(52) U.S. Cl.
CPC ............... *F21V 3/02* (2013.01); *F21S 8/086* (2013.01); *F21V 5/00* (2013.01); *F21V 5/04* (2013.01); *F21V 11/00* (2013.01); *F21V 31/005* (2013.01); *G02B 5/0278* (2013.01); *G02B 19/0014* (2013.01); *G02B 19/0066* (2013.01); *F21W 2131/103* (2013.01); *F21Y 2115/10* (2016.08)

(58) Field of Classification Search
CPC ... F21S 8/086; F21V 5/04; F21V 3/02; G02B 5/0278; G02B 19/0061; G02B 19/0066; G02B 19/0014
See application file for complete search history.

(56) References Cited

U.S. PATENT DOCUMENTS

| | | |
|---|---|---|
| 6,149,283 A | 11/2000 | Conway et al. |
| 6,612,720 B1 | 9/2003 | Beadle |
| 7,144,140 B2 | 12/2006 | Sun et al. |

(Continued)

FOREIGN PATENT DOCUMENTS

WO 2015039120 A1 3/2015

*Primary Examiner* — William N Harris
(74) *Attorney, Agent, or Firm* — Cozen O'Connor

(57) ABSTRACT

Aspects of the disclosure provide a light with reduced glare and light trespass. The light includes a light source that emits light, a primary optic that at least partially encloses the light source such that at least a portion of the light emitted from the light source passes through the primary optic, and a secondary optic including a portion shaped as a non-spherical frustum. The non-spherical frustum is bounded between first and second parallel planes. The secondary optic is securable relative to the primary optic such that at least a portion of the primary optic is at least partially enclosed by the secondary optic and positioned between the first and second parallel planes.

36 Claims, 15 Drawing Sheets

(56) References Cited

U.S. PATENT DOCUMENTS

| | | | |
|---|---|---|---|
| 7,458,330 | B2 | 12/2008 | MacDonald et al. |
| 7,637,633 | B2 | 12/2009 | Wong |
| D693,511 | S | 11/2013 | Larsen et al. |
| D693,512 | S | 11/2013 | Larsen et al. |
| 8,922,124 | B2 | 12/2014 | Reed et al. |
| 8,926,138 | B2 | 1/2015 | Reed et al. |
| 9,210,759 | B2 | 12/2015 | Reed |
| D776,858 | S | 1/2017 | Ye |
| D782,725 | S | 3/2017 | Kinnune et al. |
| 9,961,731 | B2 | 5/2018 | Reed |
| D930,220 | S | 9/2021 | Xu |
| 2004/0120148 | A1 | 6/2004 | Morris et al. |
| 2004/0120156 | A1 | 6/2004 | Ryan |
| 2005/0135101 | A1 | 6/2005 | Richmond |
| 2005/0174780 | A1 | 8/2005 | Park |
| 2006/0098440 | A1 | 5/2006 | Allen |
| 2007/0279921 | A1 | 12/2007 | Alexander et al. |
| 2011/0026264 | A1 | 2/2011 | Reed et al. |
| 2013/0221829 | A1* | 8/2013 | Kitagawa ............... F21V 3/00 359/793 |
| 2014/0071675 | A1* | 3/2014 | Chang ............ G02B 19/0071 362/240 |
| 2015/0039120 | A1 | 2/2015 | Barea |
| 2016/0234899 | A1 | 8/2016 | Reed et al. |
| 2020/0224852 | A1* | 7/2020 | Liu .......................... F21V 5/04 |
| 2021/0148526 | A1* | 5/2021 | Bryan ............... G02B 5/0278 |

* cited by examiner

LUMINAIRE WITH GLARE CONTROL

BACKGROUND

Technical Field

The present application is directed to light sources for luminaires, and more specifically to light sources with accessories that control undesired glare.

Description of the Related Art

Outdoor lighting fixtures provide illumination for roadways, parking lots, parks, and other public spaces thereby increasing safety, well-being, and night-time use of these spaces. A side effect of this illumination is annoying or disabling glare created by the lighting sources that can affect those around the light sources or drivers on the roadway. There are two major forms of glare, discomfort glare and disability glare.

Referring to FIG. 1, a luminaire 10 may be positioned so as to provide illumination to an intended target area 12. A light source of the luminaire 10 outputs a total amount of light, which may include useful light 14, which illuminates the intended target area 12, and spill light 16, which illuminates an area outside the intended target area 12.

The spill light 16 may include sky glow 18 resulting from light emitted from the light source of the luminaire 10 either directly upwards or that reflects or scatters (e.g., off of the ground, structures, particulates suspended in the atmosphere, etc.) into the sky. Sky glow 18 causes a visual haze that may make it difficult to see stars and celestial bodies and may further disrupt natural cycles of humans and animals. The spill light 16 may include light trespass 20 that enters and/or illuminates areas (e.g., portions of the ground 22), outside of the intended target area 12. As shown, the light trespass 20 may cross a property line 24 (e.g., that marks a boundary of the property that includes the intended target area 12 and/or that marks a boundary of a property other than the one that includes the intended target area 12. The light trespass 20 can also cause issues for humans and animals whose natural cycles are disrupted, or at a minimum can create an annoyance or nuisance. The spill light 16 may include discomfort glare 26, which has a light level high enough to create discomfort or even pain (e.g., for a person 28 walking and/or driving within an area impacted by the spill light 16).

The discomfort glare 26 can be caused by a bright light that is higher intensity than the level for which the eye is currently adapted. It is common at night when light is observed against a dark background, such as a dark sky. The discomfort glare 26 currently does not have a measurable or calculable metric, and is assessed subjectively through individual ratings of glare perception from none to annoying to painful.

Referring to FIG. 2, another form of glare, known as disability glare, exists for drivers on a roadway and which causes a temporary loss or aberration of vision. This loss or aberration of vision decreases the driver's ability to recognize and respond to situations threatening safety or security. Stray light within the eye, produced by light sources in the driver's field of view, decreases the apparent contrast of objects against their background and reduces the driver's visual ability to discriminate between the objects and the background.

As shown in the illustrated embodiment, a streetlight (e.g., the luminaire 10) emits light at both low angles $\theta_{low}$ and high angles $\theta_{high}$ relative to the roadway surface (e.g., the surface 22). As shown, the angle of the emitted light may be measured from an axis 32 perpendicular to the surface 22. The light striking the surface 22 is called illuminance, and the light reflected from the surface 22 is called luminance and is the perceived brightness of the light by an eye (e.g., of the person 28 driving a vehicle 29, on the surface 22. The low angle light $\theta_{low}$ reflects off the surface 22 nearer to the streetlight and may result in low angle luminance 34 detected by the person 28 within the intended target area 12.

The high angle light $\theta_{high}$ reflects off the surface 22 further from the streetlight, resulting in high angle luminance 36 that may enter the eyes of the person 28 (e.g., as stray light, outside the intended target area 12). As shown, the high angle luminance 36 may enter the eyes of the person 28 at a lower angle (e.g., measured relative to a focus line 38 of the person 28 relative to an angle of entry of the low angle luminance 34 into the eyes of the person 28. As shown, the focus line 38 may be parallel to the surface 22). Additionally, as the driver proceeds further along the roadway, the high angle light can shift from being reflected to being direct light from the streetlight into the driver's eyes from a high angle.

The stray light causes "signal noise" within the eye's retina that produces a haze or veil superimposed over the focused image that reduces overall contrast of the scene. The stray light creating the veil is known as veiling luminance and is the primary metric used for calculating disability glare in streetlighting standards. Sensitivity to veiling luminance is known to increase with age. Drivers on a roadway can face both discomfort glare from light sources that have too much intensity for the eye's adapted level and disability glare from high angle luminance (i.e., stray light) that reduces scene contrast.

While outdoor lighting has historically faced these issues, the application of LED lighting has amplified the amount of glare issues encountered for few reasons, including the following. First, the replacement of one light source (e.g., a High Intensity Discharge lamp used in legacy streetlights) with an LED light source on the same support structure (e.g., light pole) may result in a different output light pattern that can introduce higher levels of light trespass and corresponding levels of discomfort glare and higher angles of light causing more stray light for drivers. Second, the amount of light emitted from an LED light source can be higher than necessary to replace the illumination of the original (i.e., "legacy" light source), thus creating more light that can create both discomfort and disability glare.

These issues result in significantly higher numbers of community complaints of spill light and glare issues to the installers of the LED lights. To address the complaints, the installers are left with a few choices to correct the issues.

BRIEF SUMMARY

To address the discomfort glare caused by light trespass, a brightness level of the light source can possibly be reduced, or the support structure may include add-on shielding to restrict light from emitting in a specific (e.g., downward) area, such as behind or to one side of a support structure (e.g., light pole) of the luminaire. Additionally, the brightness of the replacement light source can be reduced to a level that minimizes the amount of light spill or the intensity of the discomfort glare. Finally, some form of secondary optic or lens can be added to soften the perceived brightness of the replacement light source.

Similarly, solutions for reducing disability glare to drivers include reduced luminaire brightness, adding shields to a luminaire to limit high angle stray light, and adding secondary optics. However, the application of these solutions to correct disability glare is more complicated than for discomfort glare, as each solution may reduce the luminaire performance below streetlight design guidelines for a specific portion of roadway. These guidelines focus on minimum lighting levels and minimum uniformity of light for a given distance between light poles, in addition to the maximum calculation veiling luminance allowed.

Luminaires may include primary optics and secondary optics. The purpose of the primary optic is to reshape the light pattern emitted by LEDs to be more effective in a streetlight application. Typical LED luminaires consist of an LED light source that provides a raw downward cone of light onto the street/surface that is akin to a spotlight directly under the luminaire. The shape, intensity, and location of the raw downward light rarely matches the rectangular dimensions of a roadway segment between light poles. Roadway lighting design guidelines also dictate the average brightness required over the roadway target area, a minimum uniformity of the light (a measure of the brightest points versus the average or minimum points), and a measure of veiling luminance.

The primary optic may be developed to reshape the delivered light, starting with the raw LED source(s) and through optical control (e.g., refraction, reflection and/or diffusion) redistributing the light in a uniform manner onto the roadway. To be effective, the primary optic must redirect the light source in significant ways to fit the street and pole spacing profile correctly. In addition, different types of streets may require different primary optics to achieve a proper light distribution, with each having its own specific distribution profile and effect from a glare perspective. In most cases, it is the high angle light that is created by the primary optics that is the major source of both discomfort and disability glare.

The use of secondary optics, sometimes in conjunction with light shields, is often the most effective method of glare control. These secondary optics may be placed over the primary optic to modify the primary optic's distribution in some way.

One known variation of secondary optic is a hemispherical or dome-shaped optic of clear transmissive material covering or enclosing the entire primary optic(s) of the luminaire. This variation of secondary optic generally may have the least effect on glare as it will have minimal refraction impact on the primary optic distribution and some reduction of intensity at higher angles. The addition of less transmissive diffusion material, or other refractive elements added to the material, can benefit overall discomfort glare. These additions can reduce the overall brightness of a luminaire while reducing peaks of brightness at different angles. However, they can, at the same time, have a negative effect on disability glare as the cumulative diffused or redirected light created is scattered at higher angles than the primary optic on the roadway surface.

Another known variation of secondary optic is a flat plate of clear transmissive material extending over or enclosing the entire primary optic(s) of the luminaire. This variation may be more effective at reducing glare than the hemispherical shape, as the flat secondary optic passes through light that is perpendicular to the flat secondary optic. As the light angle increases, refraction in the material of the secondary optic may reduce the angle as it exits the secondary optic up to a critical angle point where light begins to reflect off the flat secondary optic and does not pass through. The net effect of the flat secondary optic is to push medium angle light out at a lower angle and completely filter out high angle light. This usually has the positive effect of reducing both discomfort and disability glare. One negative effect of the flat secondary optic is the loss of the high angle light, which may significantly reduce the uniformity of the overall distribution and the ability to provide adequate light levels between the poles per the streetlighting guidelines. Adding diffusion or additional refractive elements can further reduce discomfort glare but at a reduced light level and/or uniformity level to meet the streetlight guidelines.

According to one aspect of the disclosure, a secondary optic is provided that is a hybrid between the flat secondary optic (e.g., for enhanced low and medium angle light behavior), and a dome/spherical secondary optic (e.g., for enhanced high angle light behavior). As described in detail below, a secondary optic of the disclosure may pass high angle light through, but under control regarding which angles are passed, thereby obtaining an output that is more effective at both discomfort and disability glare control, while maintaining overall roadway performance equivalent to most primary lens-only solutions.

Historically, secondary lenses have not been field-installable on outdoor lamps due to the complexities of mounting and sealing them from moisture. Additionally, installing secondary lenses, specifically hemispherical/dome types, can have the effect of creating unwanted uplight from the fixture and require additional shielding to correct the new problem. Most outdoor LED fixtures are not designed for the addition of secondary lenses at all.

Aspects of the disclosure provide a light including a light source that emits light, a primary optic that at least partially encloses the light source such that at least a portion of the light emitted from the light source passes through the primary optic, and a secondary optic that includes a portion shaped as a non-spherical frustum. The non-spherical frustum is bounded between a first plane and a second plane that are parallel to one another. The secondary optic is securable relative to the primary optic such that at least a portion of the primary optic is at least partially enclosed by the secondary optic and positioned between the first plane and the second plane.

Aspects of the disclosure provide a method of assembly and/or installation of a light. The method includes securing a light source to a housing, securing a primary optic to the housing such that the primary optic at least partially encloses the light source and such that at least a portion of the light emitted from the light source passes through the primary optic, and securing a secondary optic that includes a portion shaped as a non-spherical frustum bounded between two parallel planes to the housing. Securing the secondary optic to the housing includes at least partially enclosing at least a portion of the primary optic within an interior cavity of the secondary optic that is positioned between the two parallel planes.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn, are not necessarily intended to convey any information regarding the actual shape of the particular elements, and have been solely selected for ease of recognition in the drawings.

DETAILED DESCRIPTION

Figure 1:
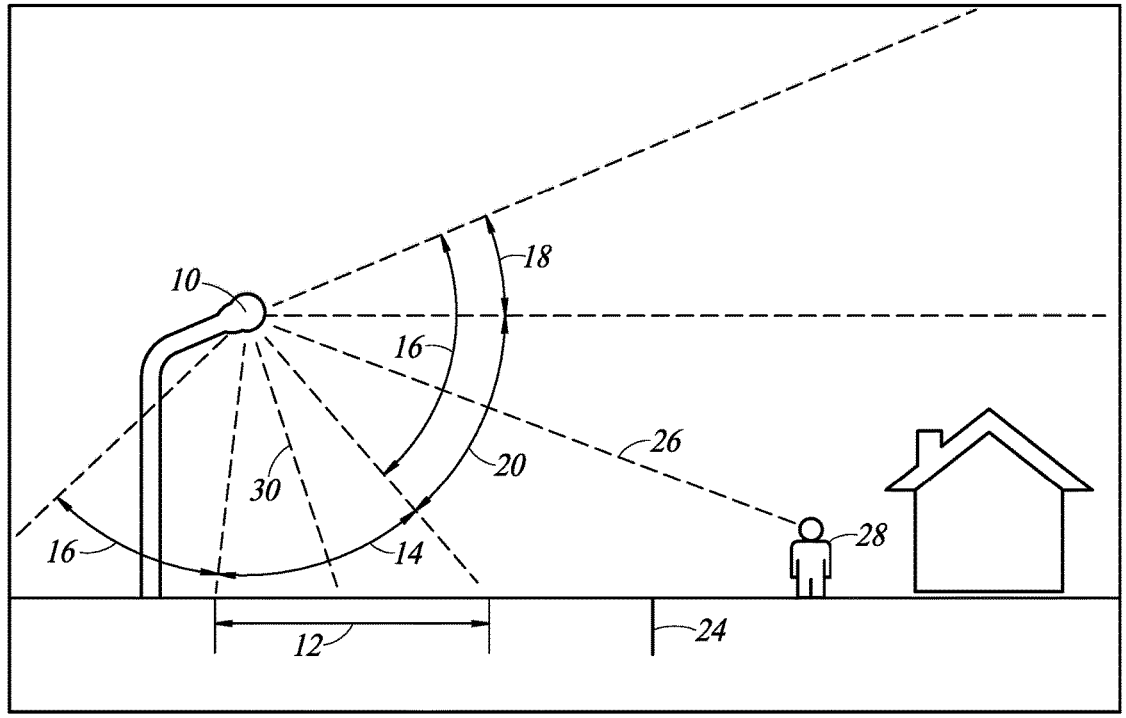
FIG. 1 is a schematic view of a known distribution of emitted light from a light source.
Figure 2:
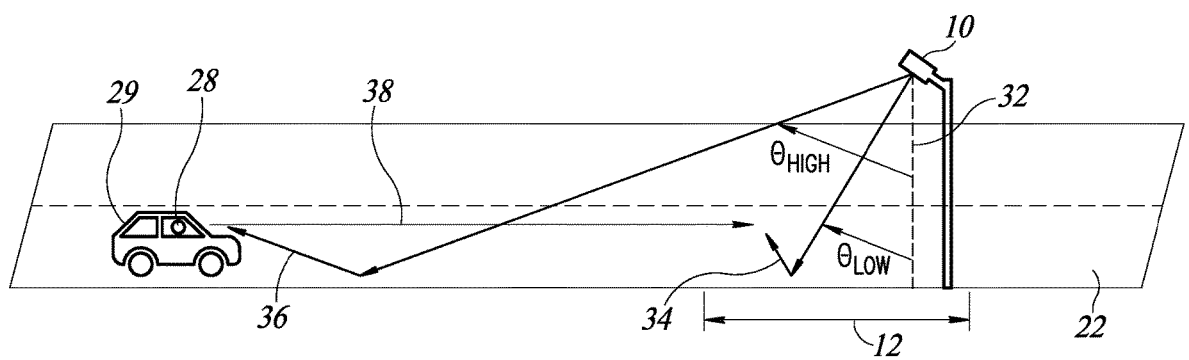
FIG. 2 is another schematic view of a known distribution of emitted light from a streetlight.

In the following description, certain specific details are set forth to provide a thorough understanding of various disclosed embodiments. However, one skilled in the relevant art will recognize that embodiments may be practiced without one or more of these specific details, or with other methods, components, materials, etc. In other instances, well-known structures associated with luminaires have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense that is as "including, but not limited to."

Reference throughout this specification to "an aspect," "one aspect," "one embodiment," or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. For example, certain features of the disclosure which are described herein in the context of separate embodiments may also be provided in combination in a single embodiment. Conversely, various features of the disclosure that are described in the context of a single embodiment may also be provided separately or in any subcombination.

As used in this specification and the appended claims, the singular forms "a," "an," and "the" include plural referents unless the content clearly dictates otherwise. It should also be noted that the term "or" is generally employed in its broadest sense, which is as meaning "and/or" unless the content clearly dictates otherwise. Reference herein to two elements "facing" or "facing toward" each other indicates that a straight line can be drawn from one of the elements to the other of the elements without contacting an intervening solid structure.

Recitation of ranges of values herein are merely intended to serve as a shorthand method of referring individually to each separate value falling within the range including the stated ends of the range, unless otherwise indicated herein, and each separate value is incorporated into the specification as if it were individually recited herein.

Aspects of the disclosure will now be described in detail with reference to the drawings, wherein like reference numbers refer to like elements throughout, unless specified otherwise. Certain terminology is used in the following description for convenience only and is not limiting. The term "plurality", as used herein, means more than one. The terms "a portion" and "at least a portion" of a structure include the entirety of the structure.

The headings and Abstract of the Disclosure provided herein are for convenience only and do not interpret the scope or meaning of the embodiments.

Figure 3:
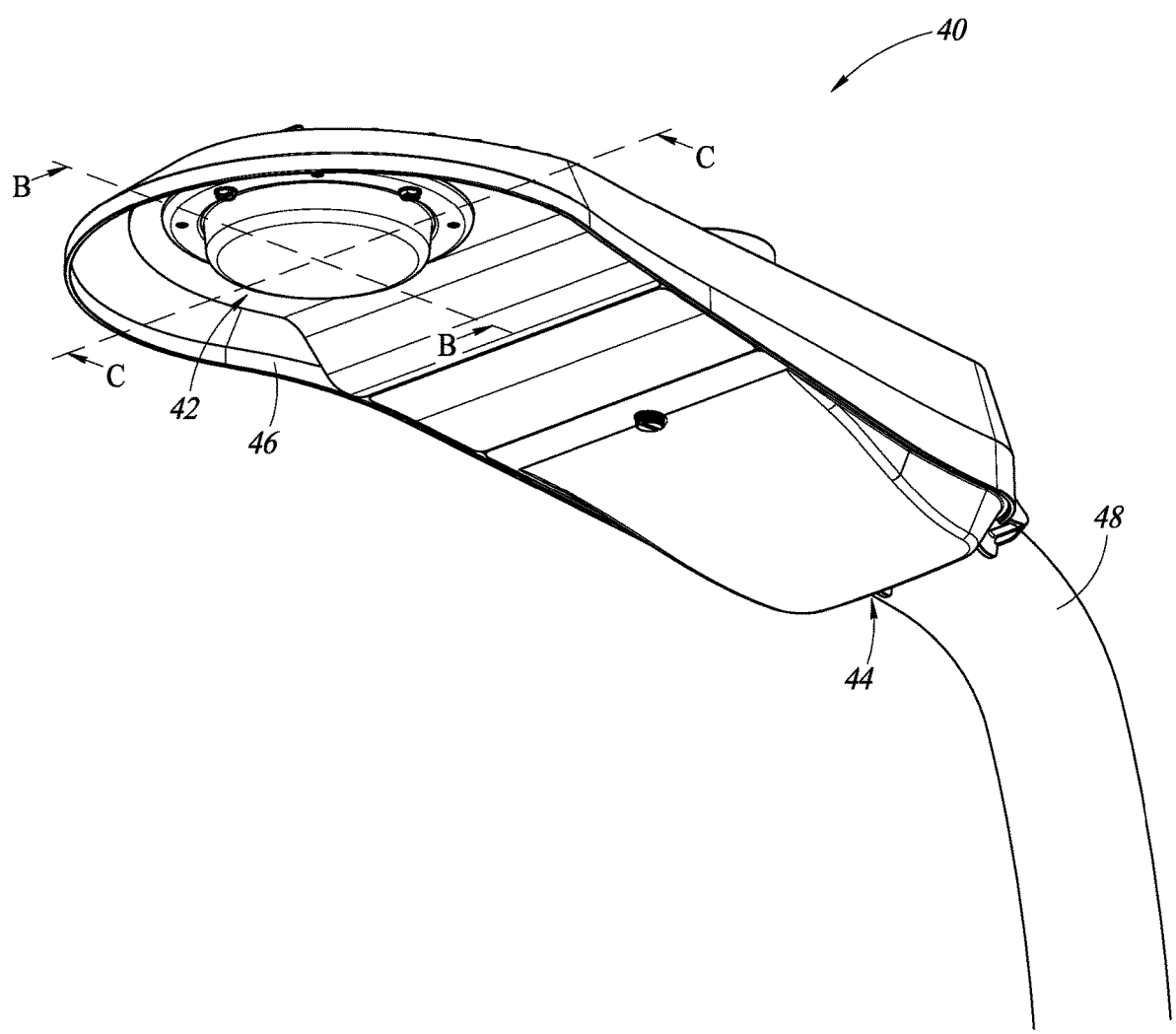
FIG. 3 is a bottom, isometric view of a luminaire including a light, according to at least one illustrated implementation.
Figure 4:
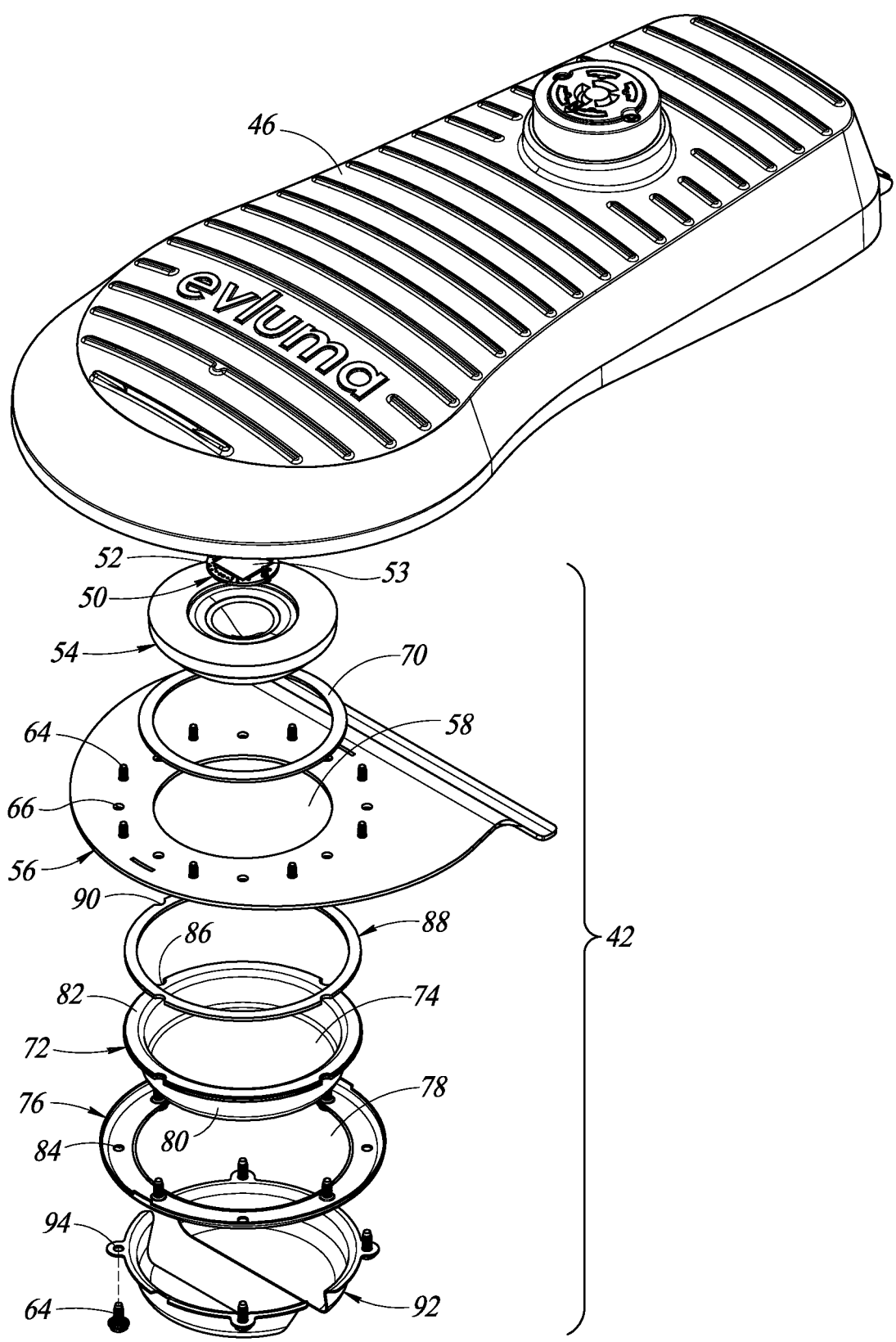
FIG. 4 is an exploded, top, isometric view of a light and a housing, according to at least one illustrated implementation.
Figure 5:
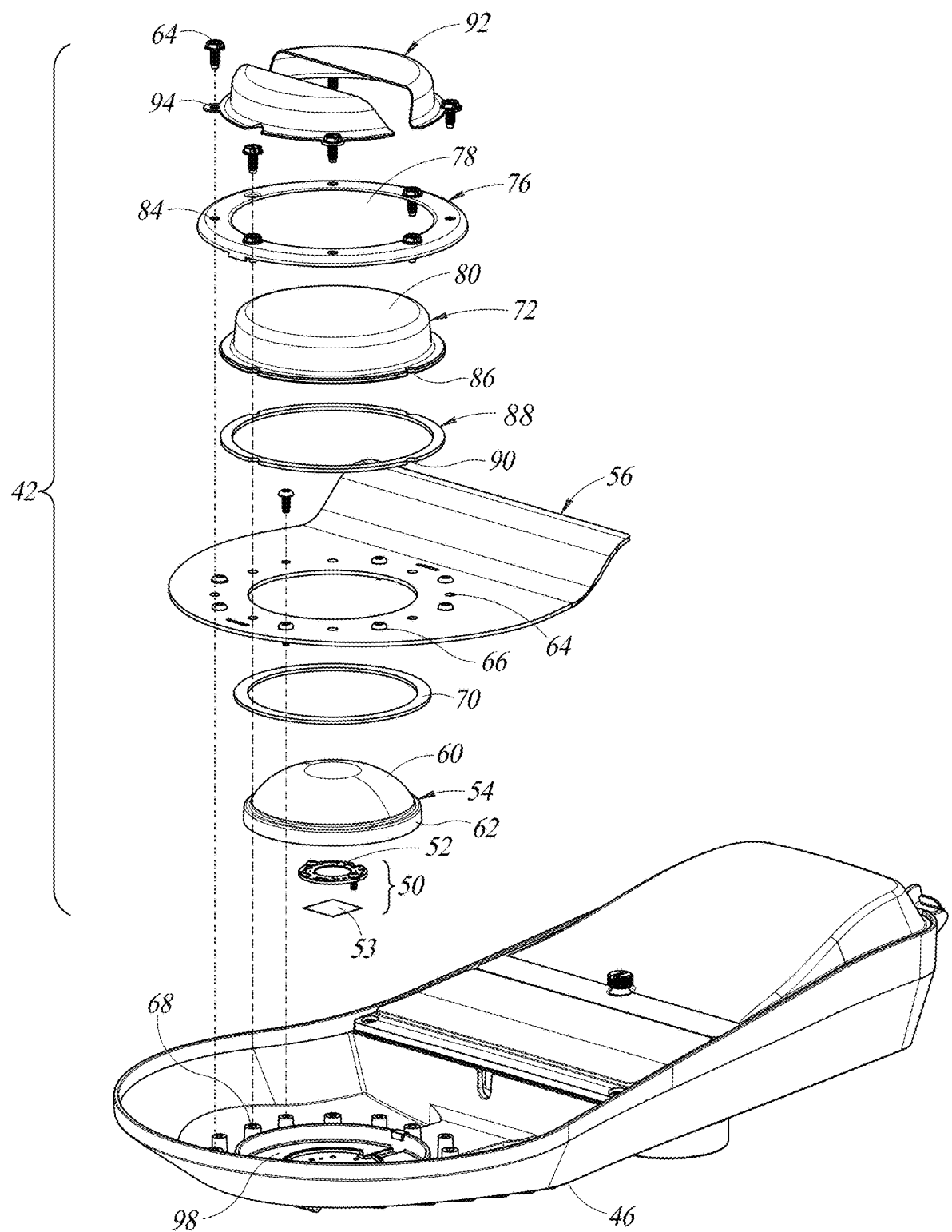
FIG. 5 is an exploded, bottom, isometric view of the light and the housing illustrated in FIG. 4, shown in a different orientation.
Figure 6:
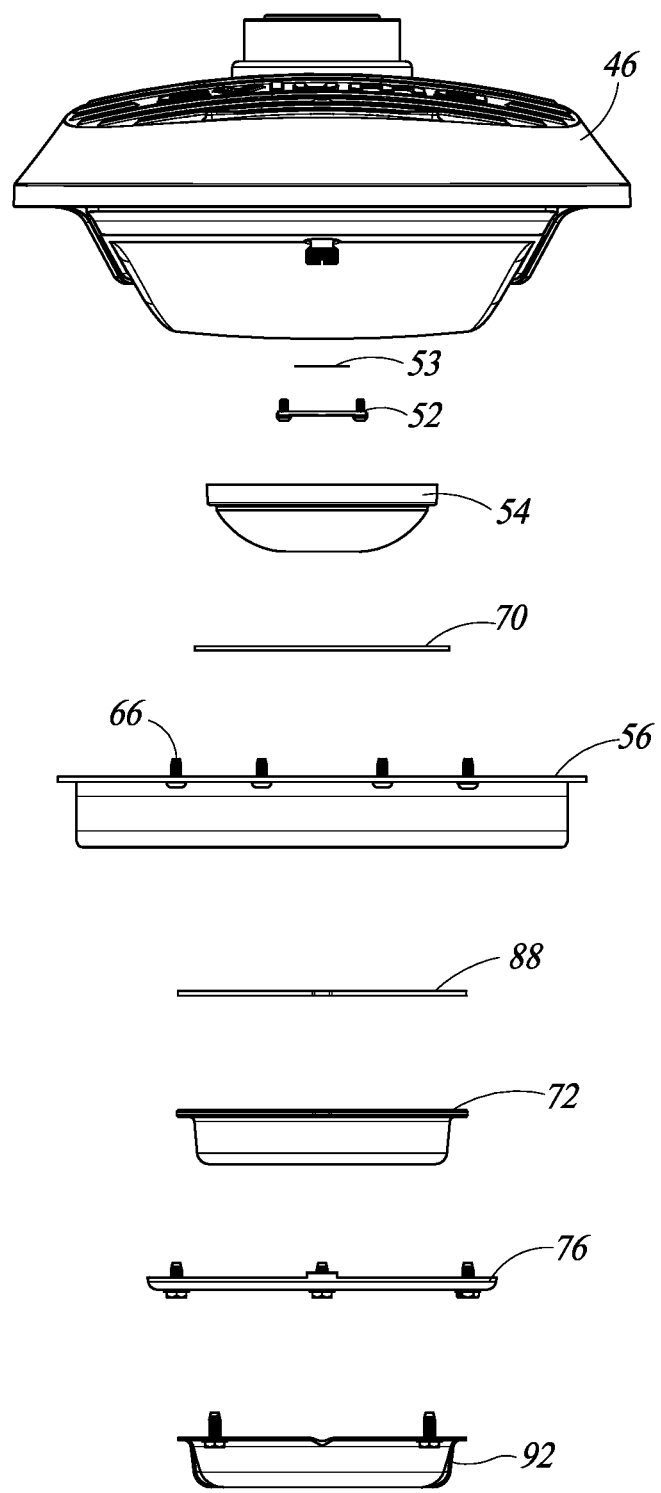
FIG. 6 is an exploded, front, elevation view of the light and the housing illustrated in FIG. 4.
Figure 7:
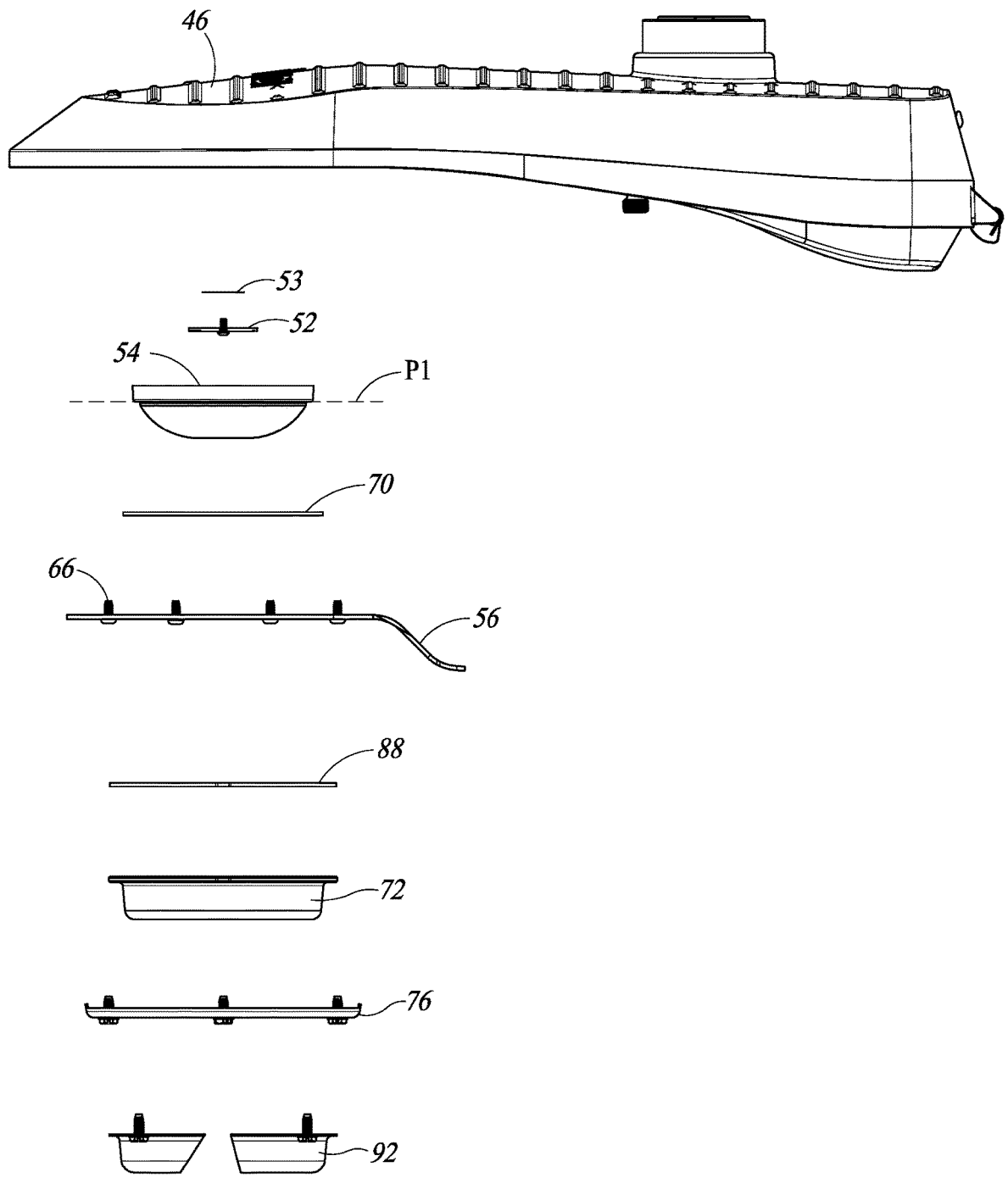
FIG. 7 is an exploded, side, elevation view of the light and the housing illustrated in FIG. 4.

Referring to FIG. 3, a luminaire 40 includes a light 42 (i.e., a lamp) and a support structure 44 (e.g., a housing 46 and a support member 48) that supports the light 42 in a desired position. The housing 46 may include retention features (as will be described in detail below) that secure the light 42 to the support structure 44. The retention features may enable disengagement of a light (e.g., one of the lights 42) from the support structure 44 and replacement of the disengaged "legacy" light with a replacement light (e.g., another one of the lights 42). Thus, as the legacy light burns out, is damaged, becomes obsolete, or is otherwise rendered undesirable, the retention features enable replacement of the legacy light with a replacement light (e.g., the light 42) without undue replacement of excess features of the support structure 44.

The housing 46 may protect the light 42 from moisture, impact, and other potential hazards. The housing 46 may include an opaque material and may be shaped such that when the light 42 is secured to the housing 46, the light 42 and the housing 46 (e.g., the opaque material) cooperatively block any direct uplight (light that travels away from a surface, such as the ground, upon which the luminaire 40 is positioned).

The support member 48 may support the housing 46 in a desired location (e.g., at a desired height above the ground) such that an axis of maximum intensity 30 of the light 42 is directed toward the intended target area 12 (as shown in FIG. 1).

Referring to FIGS. 4 to 7, the light 42 may include a light source 50. The light source 50 may be operable between at least an ON state in which the light source 50 emits light and an OFF state in which the light source 50 does not emit light. The light source 50 may include one or more sub-sources (i.e., individual elements that each emit light in the ON state). According to one embodiment the one or more sub-sources include light emitting diodes (LEDs). The light source 50 may include a single sub-source (e.g., centrally located in the light source). The light source 50 may include a plurality of sub-sources arranged as a plurality of discrete elements (e.g., in a grid, pattern, or irregularly spaced apart from adjacent ones of the plurality of sub-sources). According to one embodiment, the plurality of sub-sources may be arranged as a plurality of arrays of LEDs.

The light source 50 may be arranged in sets of light sources, the light sources in each set electrically coupled with one another and operable together with one another. The light sources of each set of light sources may be aligned along a respective axis of the set, or may be distributed in some other pattern, for example aligned along a curve or along an arc, or positioned in a two-dimensional array. The sets of light sources may be arranged spatially and angularly offset from one another. For example, when arrayed along respective axes, those axes may be non-parallel to one another, or even perpendicular to one another.

The light source 50 may include an LED module 52. The LED module 52 may include one or more larger LEDs, one or more smaller LEDs (e.g., arranged in one or more arrays), or a combination of larger and smaller LEDs. The light source 50 may include a heatsink 53 (e.g., a chip-on-board configuration mounted on a metal heatsink). The term "chip-on-board" (COB) refers to the mounting of bare LED chips in direct contact with a substrate (e.g., silicon carbide or sapphire), which allows for a much higher packing density of a set of LEDs than in conventional configurations, such as surface mounted devices.

The light 42 may include a primary optic 54. The primary optic 54 may enclose the light source 50 such that at least a portion of the light emitted from the light source 50 passes through the primary optic 54. This may allow the luminaire 40 to produce one or more light distribution patterns to illuminate an intended target area, according to at least one implementation. The primary optic 54 may be secured to the housing 46 to ensure a stable and fixed position over the light source 50. According to as aspect of the disclosure, the luminaire 40 may include a plurality of the primary optics 54, each secured relative to the housing 46. The use of multiple primary optics 54 may enable the luminaire 40 to increase its light output or achieve a desired distribution pattern.

The primary optic 54 may be secured relative to the housing 46 by any of a variety of connectors. For example, the primary optic 54 may be secured to the housing 46 (e.g., directly to the housing 46) by one or more fasteners (e.g., clips, screws, etc.) or by other known connection methods (e.g., adhesive, friction fit). According to one aspect of the disclosure, the light 42 may include a primary retention member 56. As shown in the illustrated embodiment, the primary retention member 56 may be in the form of a retention plate. The primary retention member 56 may include an opening 58 sized to allow passage of a portion 60 of the primary optic 54 therethrough and block passage of a base portion 62 of the primary optic 54 therethrough. The primary retention member 56 may secure the primary optic 54 relative to the housing 46, while also enclosing wiring and/or other electrical or power delivery components (e.g., that supply power from a power source, such as an electrical grid, battery, etc., to the light source 50).

According to one embodiment, the portion 60 of the primary optic 54 may be passed through the opening 58 until the base portion 62 of the primary optic 54 abuts the primary retention member 56. The primary retention member 56 may then be secured relative to the housing 46 such that the base portion 62 of the primary optic 54 is positioned between the housing 46 and the primary retention member 56.

The primary retention member 56 may be secured to the housing 46 by any known method, including but not limited to the use of fasteners 64. As shown, the primary retention member 56 may include one or more apertures 66 that align with corresponding apertures 68 (e.g., threaded apertures) of the housing 46. Once the corresponding apertures 66 and 68 are aligned one of the fasteners 64 may be inserted through one of the apertures 66 and into one of the corresponding apertures 68, thus securing the primary optic 54 and the primary retention member 56 relative to the housing 46.

The light 42 may include one or more seals. The one or more seals may include at least one primary seal 70. The at least one primary seal 70 may be positioned so as to form a liquid impermeable barrier that prevents entry of water into an interior space (e.g., in which the light source 50 is enclosed). According to one embodiment, the at least one primary seal 70 may be positioned between the primary optic 54 and the housing 46. Securing the primary optic 54 relative to the housing 46 may compress the at least one primary seal 70 so as to form the liquid impermeable barrier.

According to one embodiment, one of the one or more primary seals 70 may be positionable between the primary retention member 56 and the primary optic 54. The one or more primary seals 70 may have a shape that corresponds to the base portion 62 of the primary optic 54 or some other shape that prevents the primary seal 70 from passing through the opening 58. According to one embodiment, the opening 58, the base portion 62, the primary seal 70, or any combination thereof may be circular. However, the light 42 may include other shapes of the opening 58, the base portion 62, and the primary seal 70. The primary seal 70, when positioned between the primary optic 54 and the primary retention member 56 and when the primary optic 54 and the primary retention member 56 are secured to the housing 46, may form a liquid impermeable barrier between the primary optic 54 and the primary retention member 56.

The light 42 may include a secondary optic 72. The secondary optic may reduce glare of the light 42 emitted to the surrounding environment. Glare reduction may be accomplished by the secondary optic via light diffusion, light refraction, or a combination of light diffusion and light diffraction. The secondary optic 72 may be designed, selected, etc. so as to match with a primary optic (e.g., the primary optic 54) such that the combination produces a desired light distribution pattern.

The secondary optic 72 may be securable relative to the primary optic 54 such that at least a portion of the primary optic 54 is at least partially enclosed within the secondary optic 72 (e.g., positioned within an interior cavity 74 of the secondary optic 72). According to one embodiment, when the primary optic 54 is at least partially enclosed within the secondary optic 72 at least a portion of the light emitted from the light source 50 passes through both the primary optic 54 and the secondary optic 72. According to as aspect of the disclosure, the luminaire 40 may include a plurality of the secondary optics 72, each secured relative to one or more of the primary optics 54. For example, a first one of the plurality of secondary optics 72 may at least partially enclose a first of the plurality of primary optics 54. In one embodiment, the secondary optic 72 (e.g., one of the plurality of secondary optics 72) may at least partially enclose a plurality of the plurality of primary optics 54.

According to one aspect of the disclosure, the light 42 may include a secondary retention member 76. As shown in the illustrated embodiment, the secondary retention member 76 may be in the form of a retention plate. The secondary retention member 76 may include an opening 78 sized to allow passage of a portion 80 of the secondary optic 72 therethrough and block passage of a base portion 82 of the secondary optic 72 therethrough.

According to one embodiment, the portion 80 of the secondary optic 72 may be passed through the opening 78 until the base portion 82 of the secondary optic 72 abuts the secondary retention member 76. The secondary retention member 76 may then be secured relative to the housing 46 (e.g., by being secured directly to the primary retention member 56) such that the base portion 82 of the secondary optic 72 is positioned between the housing 46 and the secondary retention member 76.

The secondary retention member 76 may be secured to the housing 46 by any known method, including but not limited to fasteners (e.g., the fasteners 64). As shown, the secondary retention member 76 may include one or more apertures 84 that align with corresponding apertures (e.g., the apertures 68) of the housing 46. Once the corresponding apertures 84 and 68 are aligned one of the fasteners 64 may be inserted through one of the apertures 84 and into one of the corresponding apertures 68, thus securing the secondary optic 72 and the secondary retention member 76 relative to the housing 46.

According to one aspect of the disclosure, one of the fasteners 64 may be inserted through one of the apertures 84 of the secondary retention member 76, then through one of the apertures 66 of the primary retention member 56, and finally into one of the apertures 68 of the housing 46. The fasteners 64 used to secure the primary retention member 56 to the housing 46 and the fasteners 64 used to secure the secondary retention member 76 to the housing 46 may be the same (identical pitch and size), similar (same pitch and different size), or different (different pitch and different size). Similarly, the apertures 66 of the primary retention member 56 may all be the same size, or may have different sizes for the apertures to receive the corresponding size of the fastener 64 being used. Similarly, the apertures 68 of the housing 46 may all be the same size, or may have different sizes that correspond to the size of the fastener 64 being used.

The secondary optic 72 (e.g., the base portion 82) may include an alignment element 86 that properly positions the secondary optic and/or prevents rotation of the secondary optic 72 when secured between the secondary retention member 76 and the primary retention member 56. The alignment element 86 may be in the form of an aperture that at least partially encloses one of the fasteners 64 used to secure the secondary retention member 76 to the housing 46.

The light 42 may include a secondary seal 88 (e.g., positionable between the primary retention member 56 and the secondary optic 72). As shown, the secondary seal 88 may abut a surface of the primary retention member 56 opposite the surface of the primary retention member 56 abutted by the primary seal 70. The secondary seal 88 may have a shape that corresponds to the base portion 82 of the secondary optic 72 or some other shape that prevents the secondary seal 88 from passing through the opening 78.

According to one embodiment, the opening 78, the base portion 82, the secondary seal 88, or any combination thereof may be circular. However, the light 42 may include other shapes of the opening 78, the base portion 82, and the secondary seal 88. The secondary seal 88, when positioned between the secondary optic 72 and the primary retention member 56 and when the secondary retention member 76, the secondary optic 72, and the primary retention member 56 are all secured to the housing 46, may form a liquid impermeable barrier between the secondary optic 72 and the primary retention member 56.

The secondary seal 88 may include an alignment element 90 that properly positions the secondary seal and/or prevents rotation of the secondary seal 88 when secured between the secondary optic 72 and the primary retention member 56. The alignment element 90 may be in the form of an aperture that at least partially encloses one of the fasteners 64 used to secure the secondary retention member 76 to the housing 46. As shown, the alignment element 90 may correspond to the alignment element 86 of the secondary optic 72.

The light 42 may include a trespass shield 92. The trespass shield 92 may be securable relative to the secondary optic 72 such that at least a portion of the secondary optic 72 is at least partially enclosed within the trespass shield 92. According to one embodiment, when the secondary optic 72 is at least partially enclosed within the trespass shield 92 at least a portion of the light emitted from the light source 50 that passes through both the primary optic 54 and the secondary optic 72 is blocked by the trespass shield 92. Thus, the light 42 may include the trespass shield 92 when it is desirable to reduce a distribution of the light emitted from the light source 50 (e.g., to decrease or prevent light trespass outside the intended target area 24). When the luminaire 40 is positioned such that light trespass is less of a concern, the trespass shield 92 may be unnecessary. Thus, according to one embodiment, the light 42 may be devoid of the trespass shield 92 (as shown in FIG. 3).

The trespass shield 92 may be secured relative to the secondary optic 72 by any known method, including but not limited to fasteners (e.g., the fasteners 64). As shown, the trespass shield 92 may include one or more apertures 94 that align with corresponding apertures of the secondary retention member 76 (e.g., the apertures 84), apertures of the primary retention member 56 (e.g., the apertures 66), apertures of the housing 46 (e.g., the apertures 68), or any combination thereof. Once the apertures 94 and one or more of the apertures 66, 68, and 84 are aligned, one of the fasteners 64 may be inserted (e.g., through one of the apertures 94, through one of the apertures 84, through one of the apertures 66, and into one of the apertures 68, thus securing the trespass shield 92 relative to the housing 46.

The fasteners 64 used to secure the trespass shield 92 to the housing 46 and the fasteners 64 used to secure the secondary retention member 76 to the housing 46 may be the same (identical pitch and size), similar (same pitch and different size), or different (different pitch and different size).

Similarly, the apertures 84 of the secondary retention member 76 may all be the same size, or may have different sizes for the apertures to receive the corresponding size of the fastener 64 being used. Similarly, the apertures 68 of the housing 46 may all be the same size, or may have different sizes that correspond to the size of the fastener 64 being used.

Figure 8:
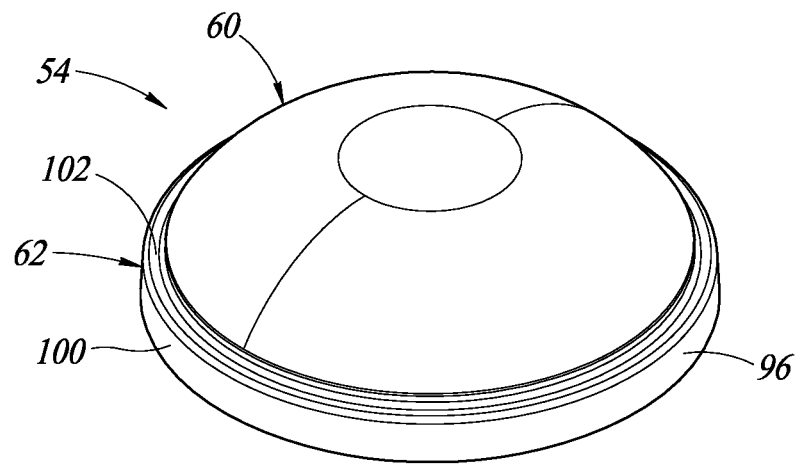
FIG. 8 is a bottom, isometric view of a primary optic of the light illustrated in FIG. 3, according to at least one implementation.
Figure 9:
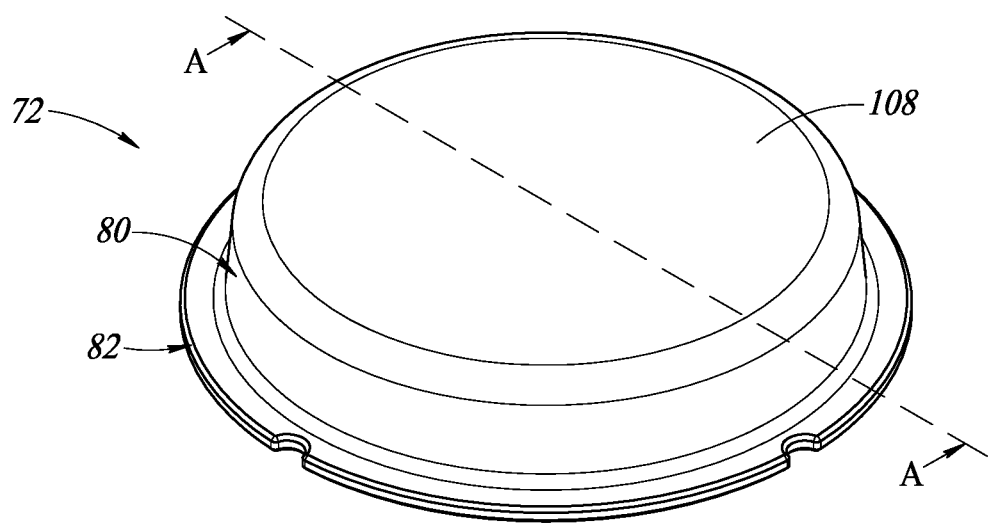
FIG. 9 is a bottom, isometric view of a secondary optic of the light illustrated in FIG. 3, according to at least one implementation.
Figure 10:
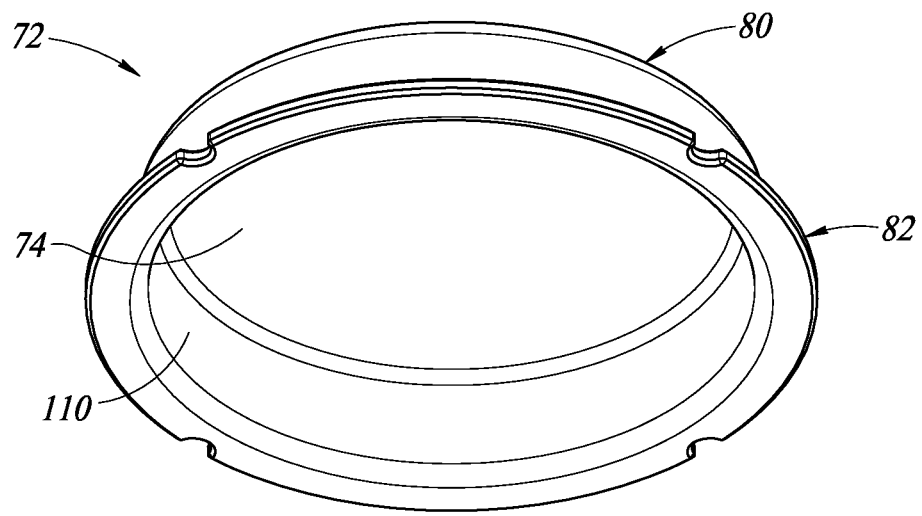
FIG. 10 is a top, isometric view of the secondary optic illustrated in FIG. 9.
Figure 11:
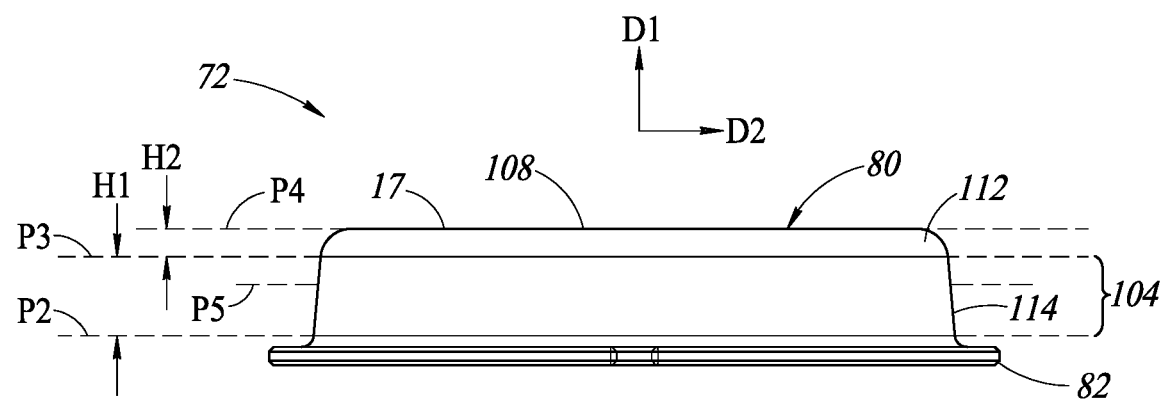
FIG. 11 is a side, elevation view of the secondary optic illustrated in FIG. 9.
Figure 12:
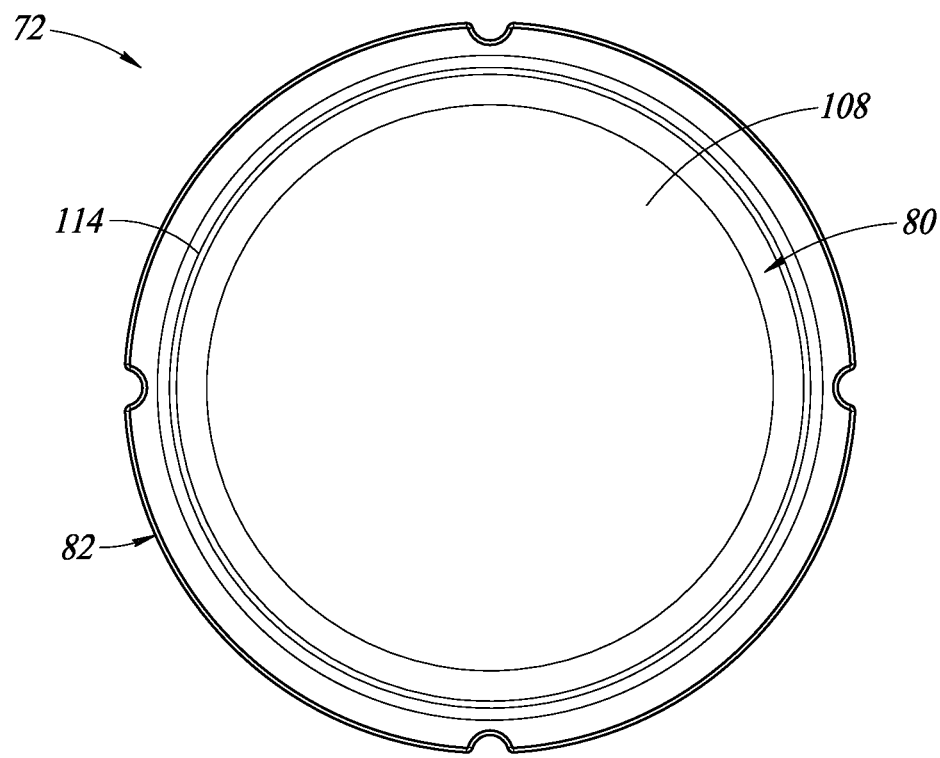
FIG. 12 is a top, plan view of the secondary optic illustrated in FIG. 9.
Figure 13:
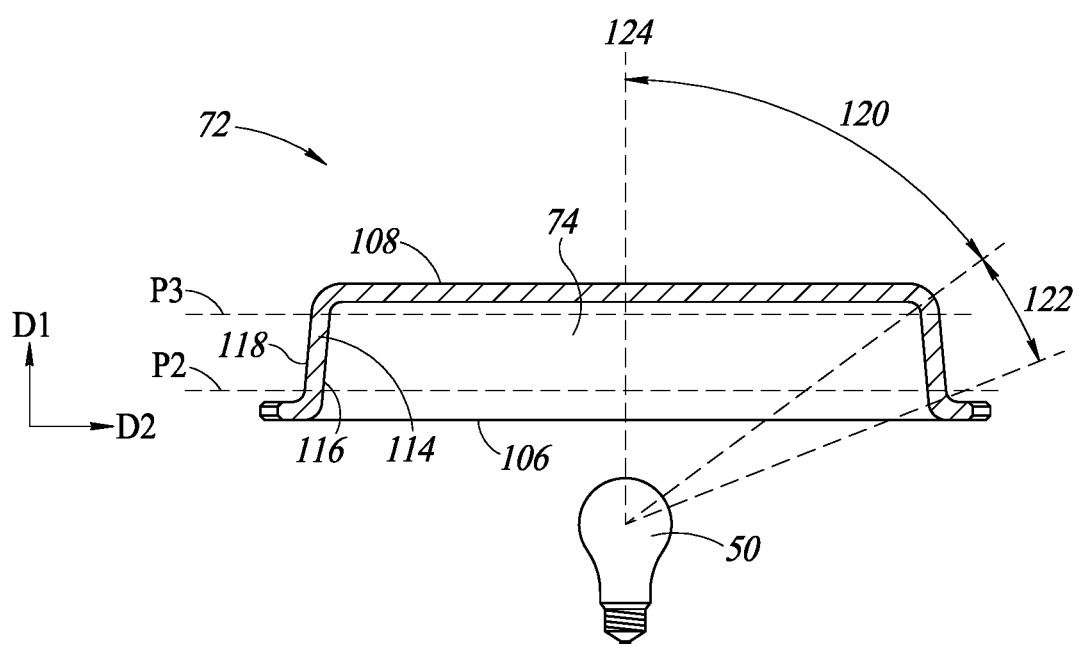
FIG. 13 is a cross-sectional, side view of the secondary optic illustrated in FIG. 9, along line A-A.

Referring to FIG. 8, the primary optic 54 may shape the light that passes through the primary optic 54 for various applications. The primary optic 54 may be constructed from glass, polycarbonate, acrylic, or other materials that allow passage of at least a portion of light through the primary optic 54.

The primary optic 54 may be a single, monolithic component or may include multiple discrete components each positioned to at least partially enclose one or more of the sub-sources of the light source 50. For example, the portion 60 and the base portion 62 may be one, monolithic piece. Alternatively, the portion 60 and the base portion 62 may be separate, discrete elements that are attached to one another (e.g., prior to being secured to a housing).

Referring to FIGS. 4 to 8, the base portion 62 may include a perimeter 96. According to one aspect of the disclosure, the perimeter 96 may correspond in shape to a recess 98 of the housing 46 such that when the perimeter 96 is received within the recess 98 the primary optic 54 is properly positioned so as to align with the remaining components of the light 42. As shown, an outer peripheral wall 100 of the perimeter 96 may have a shape that corresponds to (e.g., nests closely within) the recess 98. According to one embodiment, the outer peripheral wall 100 may form a friction fit with the recess 98.

The base portion 62 may include an engagement surface 102 that corresponds to the primary seal 70. As shown, the engagement surface 102 may include a flat ring shape, but may alternatively include other shapes that correspond to and allow a sealing engagement with the primary seal 70. According to one embodiment, the engagement surface 102 lies within a plane P1 that delineates a boundary between the portion 60 and the base portion 62.

The primary optic 54 may be securable relative to the housing 46 (e.g., directly to the housing via one or more fasteners) such that the primary optic 54 and the light source 50 at least partially enclosed therein are recessed in the housing 46 such that no emitted light from the light source 50 is directed above the luminaire 40.

According to one aspect of the disclosure, the primary optic 54 changes a path of at least a portion of the light emitted from the light source 50 as the light passes through the primary optic. The primary optic 54 may change a path of the light without magnifying the light (i.e., at least a portion of the primary optic may have a magnification of zero). The primary optic 54 may include a lens with a magnification other than zero, such that at least a portion of the light is magnified as the light passes through the primary optic 54.

Referring to FIGS. 9 to 13, the secondary optic 72 (e.g., the portion 80) may include a non-spherical frustum shaped portion 104. As shown, the non-spherical frustum shaped portion 104 may be bounded between two parallel planes P2 and P3. The secondary optic 72 may include a first, open end 106 that is closer to one of the two parallel planes (e.g., the plane P2) than the first, open end 106 is from the other of the two parallel planes (e.g., the plane P3). The secondary optic 72 may include a second, closed end 108 that is closer to the other of the two parallel planes (e.g., the plane P3) than the second, closed end 108 is from the one of the two parallel planes (e.g., the plane P2).

As shown, the first, open end 106 may form an opening 110 that provides entry into the interior cavity 74. The secondary optic 72 may include a frustum height H1 measured from one of the two parallel planes (e.g., the plane P2) to the other of the two parallel planes (e.g., the plane P3) along a direction D1 that is perpendicular to both of the two parallel planes P2 and P3.

The secondary optic 72 may include a cap portion 112 that includes the second, closed end 108. The secondary optic 72 may include a cap height H2 measured from one of the two parallel planes (e.g., the plane P3) that is closer to the cap portion 112 to a plane P4 along the direction D1. The plane P4 may be parallel to the two parallel planes P2 and P3, and the plane P4 may intersect a terminal point 17 of the cap portion 112. The terminal point 17 may be positioned such that the cap portion 112 is devoid of any points (e.g., on the second, closed end 108) that are farther from either of the two parallel planes P2 and P3 than the terminal point 17 as measured along the direction D1.

The terminal point 17 may be located on a planar surface of the cap portion 112 that is parallel to the two parallel planes P2 and P3, as shown. According to one aspect of the disclosure, the terminal point 17 may be located at an apex of a convex surface (e.g., such that the plane P4 is tangent to the convex surface at the terminal point 17). According to one aspect of the disclosure, the terminal point 17 may be located at a base of a concave surface (e.g., of the second, closed end 108).

According to one aspect of the disclosure, the frustum height H1 may be greater than the cap height H2. According to one aspect of the disclosure, the frustum height H1 may be at least two times greater than the cap height H2. According to one aspect of the disclosure, the frustum height H1 may be at least five times greater than the cap height H2. According to one aspect of the disclosure, the frustum height H1 may be at least ten times greater than the cap height H2. According to one aspect of the disclosure, the frustum height H1 may be up to at least one hundred times greater than the cap height H2. Alternatively, according to one aspect of the disclosure, the frustum height H1 may be equal to or less than the cap height H2.

According to one aspect of the disclosure, the cap portion 112 may include an entirety of the secondary optic that extends beyond the plane P3 in the direction D1. The secondary optic 72 may be devoid of a cap portion 112 (e.g., the second, closed end 108 may be parallel to the plane P3 such that the cap height H2 is zero).

The non-spherical frustum shaped portion 104 includes an outer periphery 114 that lies entirely within a frustum plane P5 that is both between the two parallel planes P2 and P3 and parallel to the two parallel planes P2 and P3. The outer periphery 114 may be formed between an inner surface 116 and an outer surface 118 of the secondary optic 72. The inner surface 116 may face in towards and delineate at least a portion of the interior cavity 74, and the outer surface 118 may be opposite (e.g., radially opposite) the inner surface 116 along a direction D2 that is perpendicular to the first direction D1, as shown in the illustrated embodiment.

According to one aspect of the disclosure, an entirety of the outer surface 118 that lies within the frustum plane P5 may have a continuously curving shape. The continuously curving shape may include, but is not limited to, a circle, an oval, or an ellipse. According to one aspect of the disclosure, an entirety of the outer surface 118 that lies within the frustum plane P5 may have a polygonal shape. The polygonal shape may have two or more sides of equal length. According to one aspect of the disclosure, an entirety of the outer surface 118 that lies within the frustum plane P5 may have at least one curved line and at least one straight line. According to one aspect of the disclosure, an entirety of the outer surface 118 that lies within the frustum plane P5 may be devoid of any straight lines.

The non-spherical frustum shaped portion 104 may include a maximum cross-sectional dimension measured in the direction D2, and the maximum cross-sectional dimension may taper down from one of the two parallel planes (e.g., the plane P2) to the other of the two parallel planes (e.g., the plane P3). Alternatively, the maximum cross-sectional dimension may taper such that the maximum cross-sectional dimension increases from one of the two parallel planes (e.g., the plane P2) to the other of the two parallel planes (e.g., the plane P3). The taper may be linear (i.e., the outer surface 118 may be a straight line from the plane P2 to the plane P3) such that the non-spherical frustum shaped portion is a conical frustum. The taper may be non-linear such that the outer surface 118 includes a concave portion, a convex portion, or both a concave portion and a convex portion.

According to one aspect of the disclosure, the maximum cross-sectional dimension may remain constant over at least a portion of the frustum height H1 from the first plane to the second plane. The non-spherical frustum shaped portion may be a cylindrical frustum (i.e., devoid of a taper).

The secondary optic 72 may be constructed of glass, polycarbonate, acrylic, or other materials that allow at least partial passage of light. The secondary optic 72 may include refractive elements or diffusion surfaces or other materials to reduce glare by varying amounts. According to one embodiment, the non-spherical frustum shaped portion 104 may include these refractive elements, diffusion surfaces, or other materials to reduce glare while the cap portion 112 is devoid of such features. According to one embodiment, the non-spherical frustum shaped portion 104 may include more of these refractive elements, diffusion surfaces, or other materials to reduce glare while the cap portion 112 includes less of these features.

The secondary optic 72 may be shaped and positioned relative to the light source 50 such that low angle light 120 from the light source 50 may pass through the second, closed end 108 with less mitigation than high angle light 122 from the light source 50 that passes through the non-spherical frustum shaped portion 104. This enables the low angle light 120, which is likely directed towards an intended target area, to retain its intensity, while minimizing glare caused by the high angle light 122, which is more likely to be directed outside the intended target area.

As shown, the low angle light 120 may include a portion of the light emitted from the light source 50. The low angle light 120 may be centered on a primary axis 124 or beam axis of the light source 50 along which intensity of the light emitted from the light source 50 is greatest. The low angle light 120 may include light up to 60 degrees from the primary axis 124, and the high angle light 122 may include light of at least 60 degrees (e.g., 60 degrees up to 90 degrees) from the primary axis 124. Alternatively, the low angle light 120 may include light that is the least offset from the primary axis 124 (e.g., up to 30 degrees from the primary axis 124), the high angle light 122 may include light that is the most offset from the primary axis 124 (e.g., at least 60 degrees from the primary axis 124), and the light may include intermediate angle light between the low angle light 120 and the high angle light 122 (e.g., between 30 degrees and 60 degrees from the primary axis 124).

The different portions of the secondary optic 72 intersecting with different portions of the light emitted from the light source 50 (e.g., the low angle light 120 intersecting the cap portion 112 and the high angle light 122 intersecting the non-spherical frustum shaped portion 104) results in different refractions of the low angle light 120 and the high angle light 122. This is an advantage over continuous, flat optics, or dome shaped (i.e., spherical) optics which intersect the low angle light 120 and the high angle light 122 with the same surface.

Referring to FIGS. 14 to 19, the secondary optic 72 may include other shapes as described herein. The secondary optic 72 may include a maximum height H3 (e.g., measured from the first, open end 106 to the second, closed end 108) along a direction (e.g., the direction D1). The base portion 82 of the secondary optic 72 may include the first, open end 106, and a remainder portion 150 (e.g., the non-spherical frustum shaped portion 104 combined with the cap portion 112) may include the second, closed end 108.

The remainder portion 150 may extend away from the base portion 82 at a non-zero angle (e.g., an acute angle, an obtuse angle, a right angle) with respect thereto. The remainder portion 150 may have a cross-sectional shape that lies entirely within a reference plane P6 that is parallel to the direction along which the maximum height H3 is measured (e.g., parallel to a straight line that extends between the first, open end 106 and the second, closed end 108). The straight line may perpendicularly intersect one or both of the first, open end 106 and the second, closed end 108. According to one aspect of the disclosure, the secondary optic 72 may be symmetrical about the reference plane P6.

Figure 17:
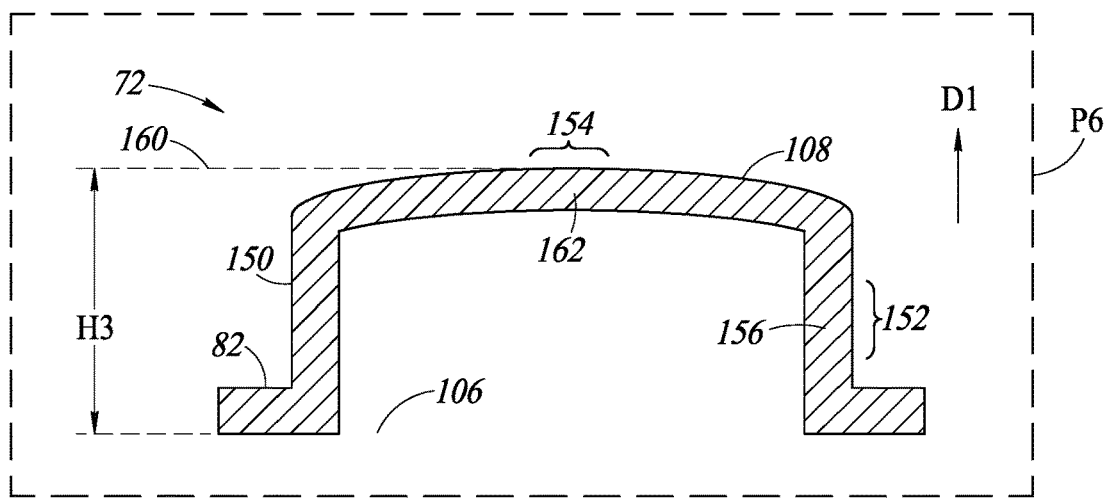
FIG. 17 is a cross-sectional, side view of a secondary optic according to one embodiment.
Figure 18:
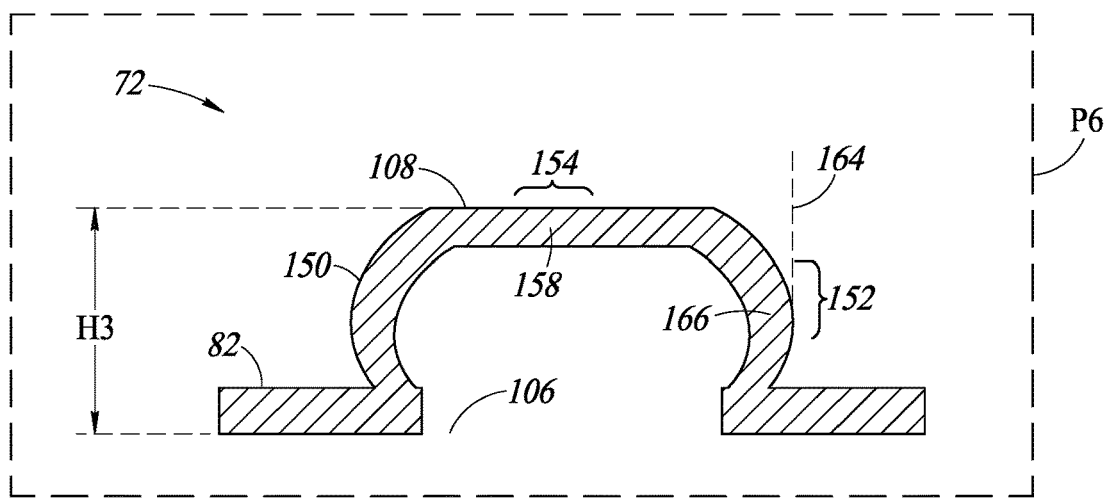
FIG. 18 is a cross-sectional, side view of a secondary optic according to one embodiment.
Figure 19:
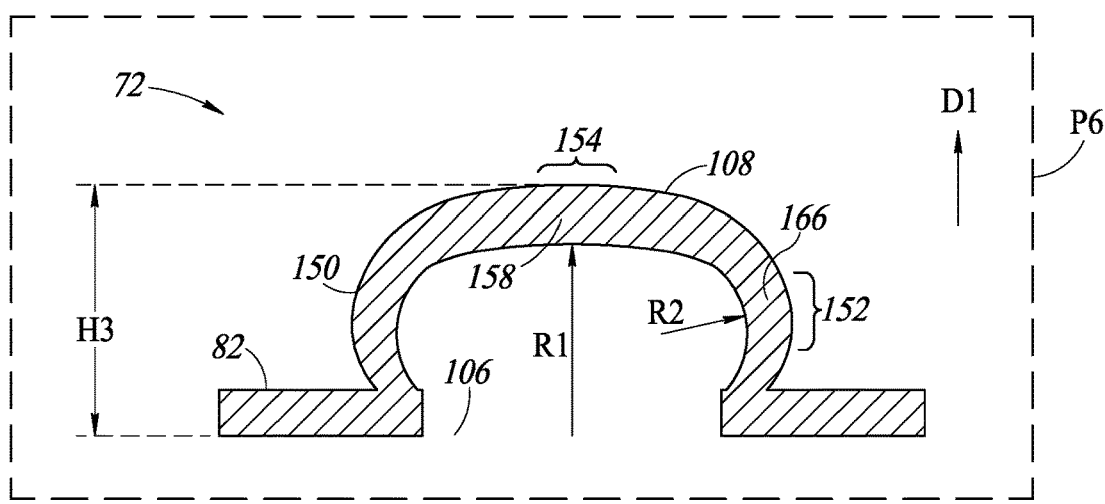
FIG. 19 is a cross-sectional, side view of a secondary optic according to one embodiment.
Figure 20:
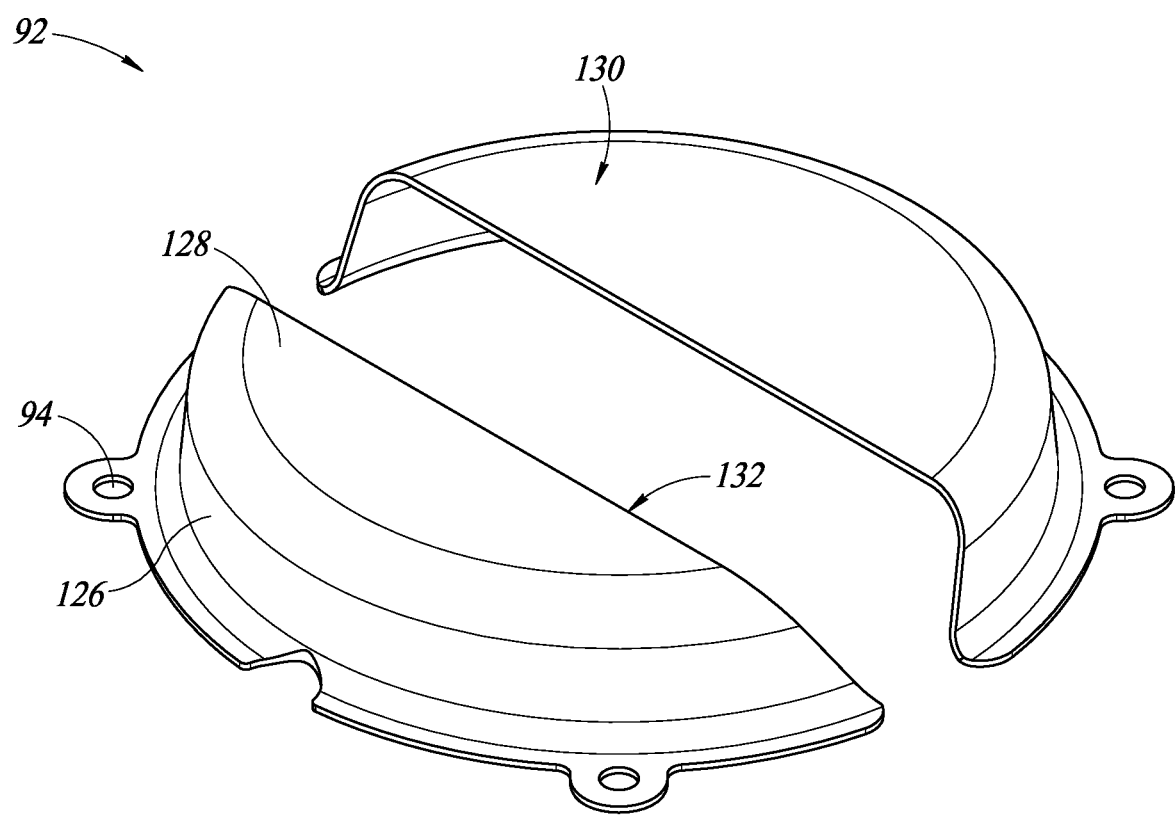
FIG. 20 is a bottom, isometric view of a trespass shield of the light illustrated in FIG. 4, according to at least one implementation.

The cross-sectional shape may include at least a first region 152 and a second region 154. The first region 152 may include a linear segment (e.g., as shown in FIGS. 14, 15, 16, and 17), multiple linear segments (e.g., at different angles), a curved segment (e.g., as shown in FIGS. 18 and 19). Similarly, the second region 154 may include a linear segment (e.g., a second linear segment) or a curved segment (e.g., a second curved segment).

Figure 14:
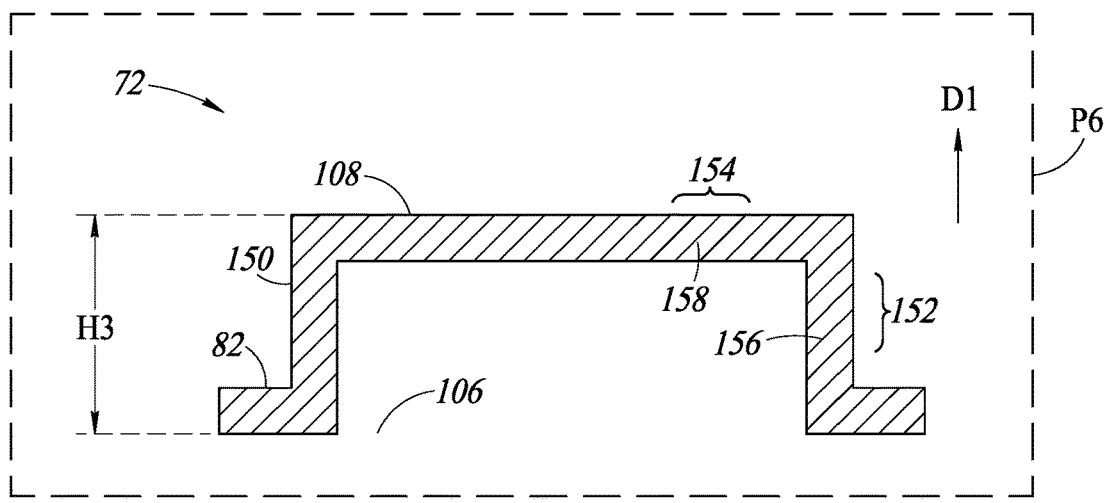
FIG. 14 is a cross-sectional, side view of a secondary optic according to one embodiment.
Figure 15:
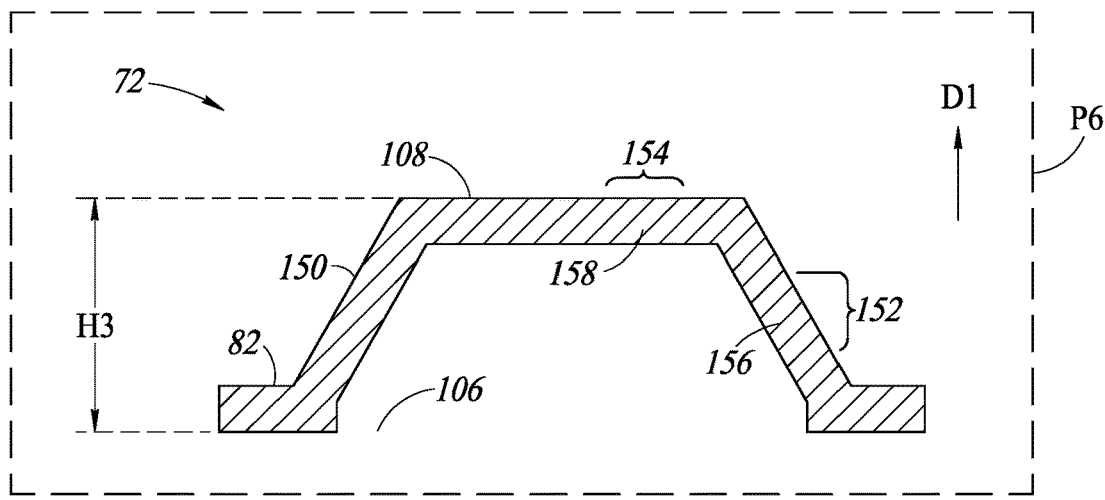
FIG. 15 is a cross-sectional, side view of a secondary optic according to one embodiment.
Figure 16:
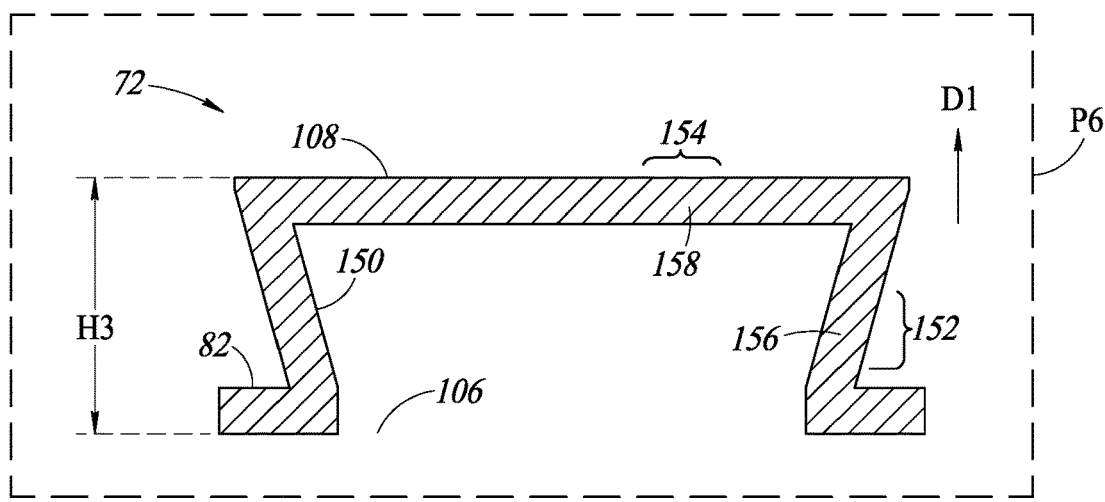
FIG. 16 is a cross-sectional, side view of a secondary optic according to one embodiment.

According to one aspect of the disclosure, the cross-sectional shape within the reference plane P6 may be shaped such that the a first linear segment 156 of the first region 152 is angularly offset with respect to a second linear segment 158 of the second region 154 (e.g., as shown in FIGS. 14, 15, and 16). According to one aspect of the disclosure, the cross-sectional shape within the reference plane P6 may be shaped such that the first linear segment 156 of the first region 152 is angularly offset with respect to a straight line 160 that both is tangent a curved segment 162 of the second region 154 and lies entirely within the reference plane P6 (e.g., as shown in FIG. 17).

According to one aspect of the disclosure, the cross-sectional shape within the reference plane P6 may be shaped such that a straight line 164 that both is tangent to a curved segment 166 of the first region 152 and lies entirely within the reference plane P6 is angularly offset with respect to the linear segment 158 of the second region 154 (e.g., as shown in FIG. 18). According to one aspect of the disclosure, the cross-sectional shape within the reference plane P6 may be shaped such that the first curved segment 166 of the first region 152 has a first radius of curvature R1, and the second curved segment 162 of the second region 154 has a second radius of curvature R2 that is different than the first radius of curvature R1 (e.g., as shown in FIG. 19).

Referring to FIGS. 9 to 20, the trespass shield 92 may include a non-spherical frustum shaped portion 126. The non-spherical frustum shaped portion 126 of the trespass shield 92 may correspond to the non-spherical frustum shaped portion 104 of the secondary optic 72. Thus, the description of the non-spherical frustum shaped portion 104 provided above is applicable to the non-spherical frustum shaped portion 126. For example, the non-spherical frustum shaped portion 126 may be a similar (e.g., the same) shape as the non-spherical frustum shaped portion 104, but a different size, such that one of the trespass shield 92 and the secondary optic 72 nests within the other of the trespass shield 92 and the secondary optic 72.

Similarly, the trespass shield may include a cap portion 128 that corresponds to at least a portion of the cap portion 112 of the secondary optic 72. Thus, the description of the cap portion 112 provided above is applicable to the cap portion 128. The trespass shield 92 may be constructed from metal, high temperature plastic, or other materials that at least significantly (e.g., completely) block passage of light.

The trespass shield 92 may include one, monolithic component. Alternatively, the trespass shield 92 may include a plurality of discrete components (e.g., a first shield component 130 and a second shield component 132) that are separately securable and/or removable relative to the secondary optic 72. According to one aspect of the disclosure, the luminaire 40 may include multiple optics (e.g., a plurality of the primary optics 54, a plurality of the secondary optics 72, or both). The trespass shield 92 may include a plurality of discrete components that partially cover the plurality of optics (e.g., the plurality of the primary optics 54, the plurality of the secondary optics 72, or both). The trespass shield 92 may include a monolithic component that partially covers a plurality of the plurality of optics (e.g., the plurality of the primary optics 54, the plurality of the secondary optics 72, or both). For example, a single component of the trespass shield 92 may partially cover a plurality of the primary optics 54, (e.g., the same side of the plurality of primary optics 54, such as the back or the front).

One or more of the plurality of discrete components may include respective non-spherical frustum shaped portions 126, cap portions 128, or both non-spherical frustum shaped portions 126 and cap portion 128.

Figure 21:
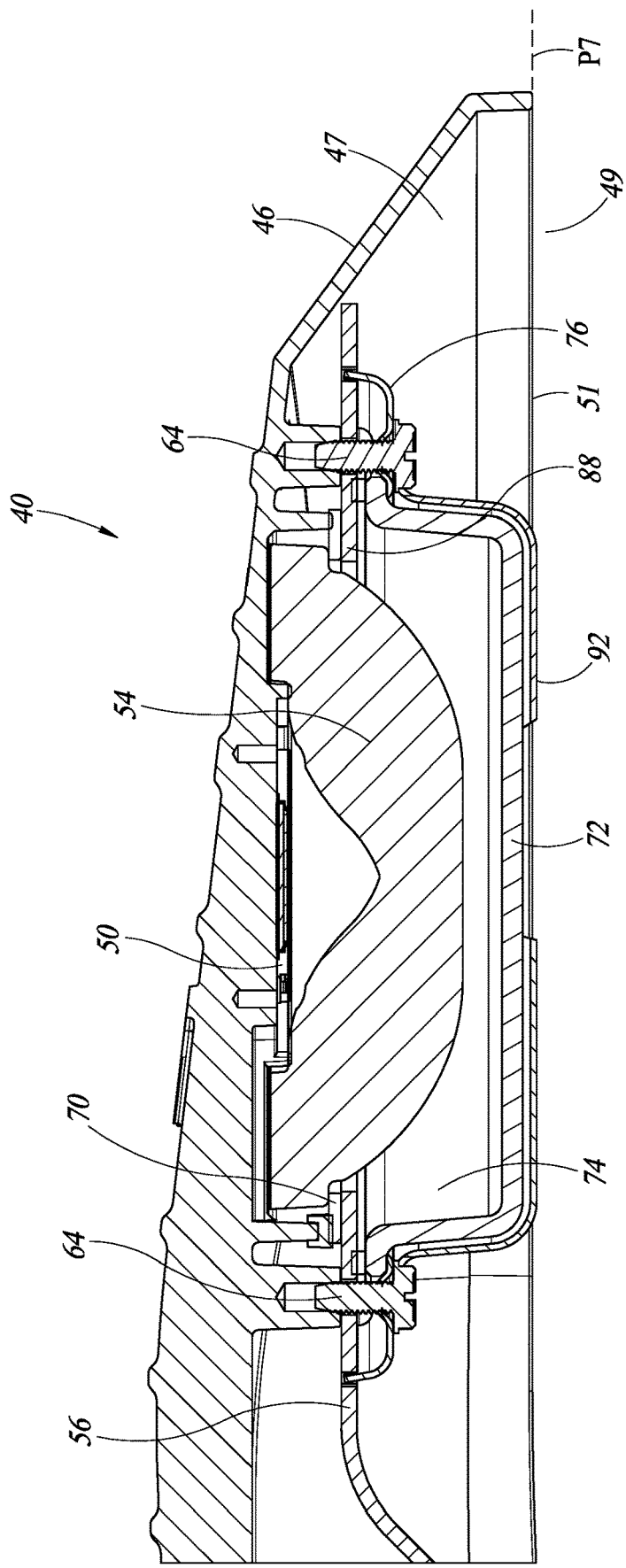
FIG. 21 is a cross-sectional, side view of the light and the housing illustrated in FIG. 3, along line B-B.
Figure 22:
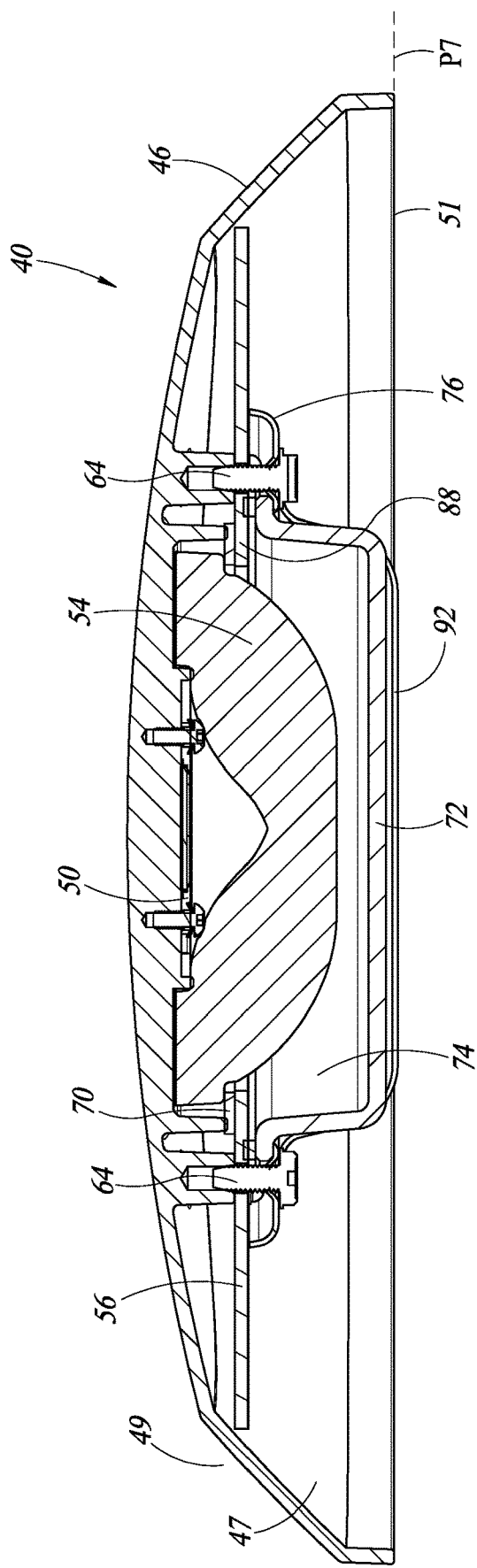
FIG. 22 is a cross-sectional, front view of the light and the housing illustrated in FIG. 3, along line C-C.
Figure 23:
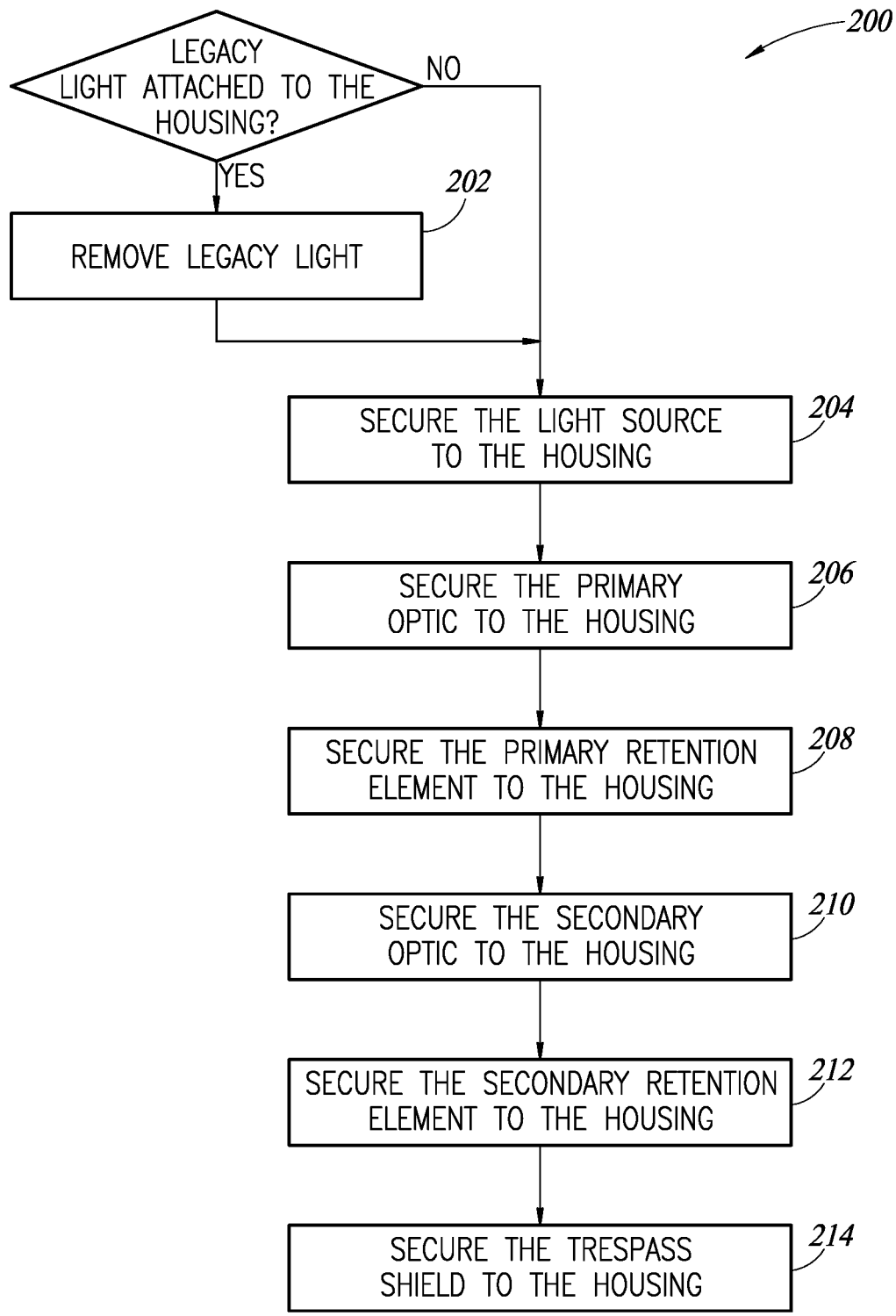
FIG. 23 is a flow diagram illustrating a method of installation of the light illustrated in FIG. 4, according to at last one implementation.

Referring to FIGS. 21 and 22, the housing 46 may have an interior 47, which the housing 46 separates from an external environment 49 (e.g., surrounding the housing 46). According to one embodiment, the interior 47 is bounded by the housing 46 and a plane P7. As shown, the plane P7 may contain an opening 51 of the housing 46 through which the primary optic 54, secondary optic 72, and trespass shield 92 are inserted when being coupled to the housing 46. The luminaire 40 may include an assembled configuration in which an entirety of the primary optic 54, an entirety of the secondary optic 72, or an entirety of both the primary optic 54 and the secondary optic 72 are positioned within the interior 47 of the housing 46 (e.g., between the plane P7 and the housing 46).

The light source 50 may be at least partially received in the interior 47 of the housing 46. The primary optic 54 may be coupled to the housing 46 and positioned between the light source 50 and the external environment 49 such that at least a portion of the light emitted from the light source 50 passes through the primary optic 54.

Referring to FIGS. 4 to 23, a method of assembling the luminaire 40 may include securing the secondary optic 72 to the housing 46 of the luminaire 40. The housing 46 may have the light source 50 at least partially received within the interior 47 of the housing 46 such that the light source 50 is operable between at least an ON state in which the light source emits light and an OFF state in which the light source does not emit light. The method may include securing the secondary optic 72 relative to the primary optic 54 of the luminaire 40 such that the primary optic 54 is positioned between the light source 50 and the secondary optic 72. Securing the secondary optic 72 relative to the primary optic 54 may include at least partially enclosing the primary optic 54 within the non-spherical frustum shaped portion 104 of the secondary optic 72 (e.g., between the two parallel planes P2 and P3).

The method may further include changing a light distribution pattern of the luminaire 40. According to one embodiment, securing the secondary optic 72 to the housing 46 changes the light distribution pattern of the luminaire 40.

A method 200 of installing the light 42 may include, at 202, removing a legacy light (if a legacy light is secured to the housing 46). The method 200 may be a method of replacing a light source within an existing luminaire, or upgrading a light to a more efficient type of light (e.g., an incandescent light to an LED light). Removing the legacy light may include removing a legacy light source, one or more optics, one or more trespass shields, or any combination thereof.

The method 200 may include, at 204, securing the light source 50 relative to (e.g., directly to) the housing 46. Securing the light source 50 may include coupling the light source 50 to a power supply. The method 200 may include, at 206, securing the primary optic 54 relative to (e.g., directly to) the housing 46. Securing the primary optic 54 may include at least partially enclosing the light source 50 such that at least a portion of the light emitted from the light source 50 passes through the primary optic 54. According to one embodiment, the light source 50 may be secured to the primary optic 54 prior to being secured to the housing 46, such that the securing of the light source 50 at 204 and the securing of the primary optic 54 at 206, occur simultaneously.

As described above, securing the primary optic 54 to the housing 46 may include, at 208, securing the primary retention member 56 relative to the housing 46. According to one embodiment, securing the primary retention member 56 may include inserting at least one fastener (e.g., the fastener 64) through one of the apertures 66 of the primary retention member 56 and into one of the apertures 68 of the housing 46 such that the securing of the light source 50 at 204, the securing of the primary optic 54 at 206, and the securing of the primary retention member 56 occur simultaneously.

The method 200 may include positioning the primary seal 70 between the primary optic 54 and the primary retention member 56. According to one embodiment, securing the primary retention member 56 may include securing the primary seal 70 between the primary optic 54 and the primary retention member 56 thereby forming a liquid impermeable barrier between the primary optic 54 and the primary retention member 56, and may include simultaneously securing the primary seal 70 between the housing 46 and the primary retention member 56 thereby forming a liquid impermeable barrier between the housing 46 and the primary retention member 56, and may include forming a liquid impermeable barrier between the housing 46 and the primary optic 54.

The method 200 may include, at 210, securing the secondary optic 72 relative to the housing 46. Securing the secondary optic 72 may include at least partially enclosing at least a portion of the primary optic 54 within the interior cavity 74 of the secondary optic 72. Securing the secondary optic 72 at 210 may include positioning at least a portion of the primary optic 54 between the two parallel planes P2 and P3 that bound the non-spherical frustum shaped portion 104. Positioning the portion of the primary optic 54 between the two parallel planes P2 and P3 may include passing the portion 60 of the primary optic 54 through the opening 110 of the secondary optic 72.

The method 200 may include, at 212, securing the secondary retention member 76 relative to the housing 46. Securing the secondary retention member 76 at 212 may include passing the portion 80 of the secondary optic 72 through the opening 78 of the secondary retention member 76 and abutting the base portion 82 of the secondary optic 72 with the secondary retention member 76.

According to one embodiment, securing the secondary retention member 76 at 212 may include inserting at least one fastener (e.g., the fastener 64) through one of the apertures 84 of the secondary retention member 76, through one of the apertures 66, and into one of the apertures 68 of the housing 46 such that the securing of the secondary optic 72 at 210 and the securing of the secondary retention member 76 at 212 occur simultaneously.

The method 200 may include positioning the secondary seal 88 between the secondary optic 72 and the primary retention member 56. According to one embodiment, securing the secondary retention member 76 may include securing the secondary seal 88 between the secondary optic 72 and the primary retention member 56 thereby forming a liquid impermeable barrier between the secondary optic 72 and the primary retention member 56.

The method 200 may include, at 214, securing the trespass shield 92 relative to the housing 46. Securing the trespass shield 92 at 214 may include positioning the non-spherical frustum shaped portion 104 between two parallel planes that bound the non-spherical frustum shaped portion 126. According to one embodiment, securing the trespass shield 92 at 214 may include inserting at least one fastener (e.g., the fastener 64) through one of the apertures 94 of the trespass shield 92, through one of the apertures 84, through one of the apertures 66, and into one of the apertures 68 of the housing 46.

Alternatively, securing the trespass shield 92 at 214 may occur prior to securing the secondary optic 72 at 210. Thus, securing the trespass shield 92 at 214 may include positioning the non-spherical frustum shaped portion 126 between the two parallel planes P2 and P3 that bound the non-spherical frustum shaped portion 104.

Securing the trespass shield 92 at 214 may include positioning the trespass shield 92 relative to the light source 50 so as to block at least a portion of the light emitted from the light source 50. According to one embodiment, the light blocked by the trespass shield 92 is light directed outside of the intended target area. According to one embodiment, the light blocked by the trespass shield 92 includes light that passes through the non-spherical frustum shaped portion 104 of the secondary optic 72, that passes through the cap portion 112, or light that passes through the non-spherical frustum shaped portion 104 of the secondary optic 72 and light that passes through the cap portion 112 of the secondary optic 72. Securing the trespass shield 92 at 214 may include securing the first shield component 130 to the housing 46, and then separately (e.g., at a different time) securing the second shield component 132 to the housing 46.

All of the U.S. patents, U.S. patent application publications, U.S. patent applications, foreign patents, foreign patent applications and non-patent publications referred to in this specification and/or listed in the Application Data Sheet, including but not limited to U.S. Application No. 63/343,488, filed May 18, 2022, are incorporated herein by reference, in their entirety. Aspects of the embodiments can be modified, if necessary to employ concepts of the various patents, applications and publications to provide yet further embodiments.

The various embodiments described above can be combined and/or modified to provide further embodiments in light of the above-detailed description, including the material incorporated by reference. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A luminaire comprising:
a housing having an interior, the housing separating the interior of the housing from at least a portion of an external environment;
a trespass shield removably coupleable to the housing;
a light source at least partially received in the interior of the housing, the light source operable between at least an ON state in which the light source emits light and an OFF state in which the light source does not emit light;
a primary optic coupled to the housing, the primary optic positioned between the light source and the external environment such that at least a portion of the light emitted from the light source passes through the primary optic; and
a secondary optic removably coupled to the housing, the secondary optic including:
a base portion that includes a first, open end of the secondary optic;
a remainder portion that includes a second, closed end of the secondary optic, the remainder portion extending away from the base portion at a non-zero angle with respect thereto, and the remainder portion having a cross-sectional shape that lies entirely within a reference plane that is parallel to a straight line that extends between the first, open end, and the second, closed end, the cross-sectional shape including at least a first region and a second region, wherein the first region includes a first linear segment or a first curved segment, the second region includes a second linear segment or a second curved segment, and one of:
1) the first linear segment is angularly offset with respect to the second linear segment;
2) the first linear segment is angularly offset with respect to a line that both is tangent to the second linear segment and lies entirely within the reference plane;
3) a line that both is tangent to the first curved segment and lies entirely within the reference plane is angularly offset with respect to the second linear segment; or
4) the first curved segment has a different radius of curvature than a radius of curvature of the second curved segment,
wherein the secondary optic is coupled to the housing such that at least a portion of the primary optic is received within a recess of the secondary optic and at least partially enclosed by the secondary optic, the recess delimited by the base portion and the remainder portion.

2. The luminaire of claim 1 wherein the secondary optic is a light diffuser.

3. The luminaire of claim 1 wherein the secondary optic has zero optical power.

4. The luminaire of claim 1 wherein the secondary optic changes a distribution pattern of the light emitted from the light source relative to a distribution pattern of the light that passes through the primary optic.

5. The luminaire of claim 1, further comprising:
a primary retention member that couples the primary optic to the housing; and
a secondary retention member that couples the secondary optic to the housing,
wherein the housing includes a set of electrical contacts to supply power to the light source, and the primary retention member and the housing including corresponding primary apertures that align to receive a fastener, thereby coupling the primary optic to the housing such that power flows through the electrical contacts to the light source, and
wherein the primary retention member, the secondary retention member, and the housing including corresponding secondary apertures that align to receive a fastener, thereby coupling the secondary optic to both the primary optic and the housing.

6. The luminaire of claim 5, further comprising:
a first seal secured between the primary retention member and the primary optic, thereby forming a first liquid impermeable barrier; or
a second seal secured between the housing and the primary optic, thereby forming a second liquid impermeable barrier; or
a third seal secured between the housing and the primary retention member, thereby forming a third liquid impermeable barrier; or
any combination of the first seal, the second seal, and the third seal.

7. The luminaire of claim 1 wherein the secondary optic is symmetrical about the reference plane.

8. A luminaire comprising:
a housing having an interior, the housing separating the interior of the housing from an external environment;
a light source at least partially received in the interior of the housing, the light source operable between at least an ON state in which the light source emits light and an OFF state in which the light source does not emit light;
a primary optic coupled to the housing, the primary optic positioned between the light source and the external environment such that at least a portion of the light emitted from the light source passes through the primary optic; and
a secondary optic including a portion shaped as a non-spherical frustum, the non-spherical frustum bounded between a first plane and a second plane that is parallel to the first plane, wherein the secondary optic is securable relative to the primary optic such that at least a portion of the primary optic is at least partially enclosed by the secondary optic and positioned between the first plane and the second plane,
wherein the secondary optic includes a first, open end that is closer to the first plane than the first, open end is from the second plane, and the secondary optic further includes a second, closed end that is closer to the second plane than the second, closed end is from the first plane, the first, open end forms an opening that is sized so as to permit entry of the at least a portion of the primary optic into an interior cavity of the secondary optic, and the secondary optic includes a frustum height measured from the first plane to the second plane along a direction that is perpendicular to both the first plane and the second plane, and
wherein the secondary optic further includes a cap portion that includes the second, closed end, and a cap height measured from the second plane to a third plane that is both parallel to the second plane and intersects a terminal point on the second, closed end, the cap portion being devoid of any points on the second, closed end that are farther from the first plane than the terminal point as measured along the direction that is perpendicular to both the first plane and the second plane.

9. The luminaire of claim 8 wherein the frustum height is greater than the cap height.

10. The luminaire of claim 8 wherein the second, closed end is parallel to the second plane, and the cap height is zero.

11. The luminaire of claim 8 wherein the second, closed end has a convex curvature and the terminal point is located at an apex of the convex curvature.

12. The luminaire of claim 8 wherein the second, closed end includes a concave curvature and the terminal point is located at a base of the concave curvature.

13. The luminaire of claim 8 wherein the portion shaped as a non-spherical frustum includes an outer periphery that lies within a frustum plane that is both between the first plane and the second plane and parallel to the first plane and the second plane, the secondary optic including an inner surface that faces the at least a portion of the primary optic when the primary optic is at least partially enclosed by the secondary optic, and the secondary optic including an outer surface opposite the inner surface.

14. The luminaire of claim 13 wherein an entirety of the outer surface that lies within the frustum plane has a continuously curving shape.

15. The luminaire of claim 13 wherein an entirety of the outer surface that lies within the frustum plane has a polygonal shape.

16. The luminaire of claim 13 wherein an entirety of the outer surface that lies within the frustum plane includes at least one curved line and at least one straight line.

17. The luminaire of claim 13 wherein an entirety of the outer surface that lies within the frustum plane is devoid of any straight lines.

18. The luminaire of claim 8 wherein the portion shaped as a non-spherical frustum includes a maximum cross-sectional dimension measured in a direction that is parallel to both the first plane and the second plane, and the maximum cross-sectional dimension tapers down from the first plane to the second plane.

19. The luminaire of claim 8 wherein the portion shaped as a non-spherical frustum includes a maximum cross-sectional dimension measured in a direction that is parallel to both the first plane and the second plane, and the maximum cross-sectional dimension tapers down from the second plane to the first plane.

20. The luminaire of claim 18 wherein the taper is non-linear and includes a concave portion or a convex portion.

21. The luminaire of claim 19 wherein the taper is non-linear and includes a concave portion or a convex portion.

22. The luminaire of claim 8 wherein the portion shaped as a non-spherical frustum includes a maximum cross-sectional dimension measured in a direction that is parallel to both the first plane and the second plane, and the maximum cross-sectional dimension remains constant from the first plane to the second plane.

23. The luminaire of claim 8, further comprising a trespass shield securable relative to the primary optic such that the trespass shield blocks passage of a portion of the light emitted from the light source that passes through the primary optic, wherein the trespass shield includes a portion shaped as a non-spherical frustum that corresponds to the portion of the secondary optic shaped as a non-spherical frustum.

24. The luminaire of claim 23 wherein the trespass shield is securable relative to the primary optic such that at least a portion of the secondary optic is positioned between the primary optic and the trespass shield.

25. The luminaire of claim 23 wherein the trespass shield includes a plurality of shields that includes at least a first shield and a second shield, each of the plurality of shields being discrete components such that are separately securable relative to the primary optic.

26. The luminaire of claim 23 wherein the light source is a first light source, the primary optic is a first primary optic, the luminaire further comprising:
a second light source at least partially received in the interior of the housing, the second light source operable between at least an ON state in which the second light source emits light and an OFF state in which the second light source does not emit light; and
a second primary optic coupled to the housing, the second primary optic positioned between the second light source and the external environment such that at least a portion of the light emitted from the second light source passes through the primary optic,
wherein the trespass shield blocks passage of both a portion of the light emitted from the first light source that passes through the first primary optic, and a portion of the light emitted from the second light source that passes through the second primary optic.

27. The luminaire of claim 8 wherein the light source includes a plurality of arrays of LEDs, the primary optic is in the form of a plurality of discrete components, and each of the plurality of discrete components at least partially encloses a respective one of the plurality of arrays of LEDs.

28. The luminaire of claim 8 wherein the primary optic is a lens with a magnification other than zero.

29. The luminaire of claim 8 wherein the primary optic changes a path of at least a portion of the light emitted from the light source that passes through the primary optic.

30. The luminaire of claim 8, further comprising:
a primary retention member that secures the primary optic relative to the housing that supports the light source;
a secondary member that secures the secondary optic relative to the primary optic; and
at least one seal that is securable relative to the primary optic and the secondary optic such that a liquid impermeable seal is formed between the primary optic and the secondary optic.

31. A luminaire comprising:
a housing having an interior, the housing separating the interior of the housing from at least a portion of an external environment;
a light source at least partially received in the interior of the housing, the light source operable between at least an ON state in which the light source emits light and an OFF state in which the light source does not emit light;
a primary optic coupled to the housing, the primary optic positioned between the light source and the external environment such that at least a portion of the light emitted from the light source passes through the primary optic; and
a secondary optic removably coupled to the housing, the secondary optic including:
a base portion that includes a first, open end of the secondary optic;
a remainder portion that includes a second, closed end of the secondary optic, the remainder portion extending away from the base portion at a non-zero angle with respect thereto, and the remainder portion having a cross-sectional shape that lies entirely within a reference plane that is parallel to a straight line that extends between the first, open end, and the second, closed end, the cross-sectional shape including at least a first region and a second region, wherein the first region includes a first linear segment or a first curved segment, the second region includes a second linear segment or a second curved segment, and one of:
1) the first linear segment is angularly offset with respect to the second linear segment;
2) the first linear segment is angularly offset with respect to a line that both is tangent to the second linear segment and lies entirely within the reference plane;
3) a line that both is tangent to the first curved segment and lies entirely within the reference plane is angularly offset with respect to the second linear segment; or
4) the first curved segment has a different radius of curvature than a radius of curvature of the second curved segment,
a primary retention member that couples the primary optic to the housing; and
a secondary retention member that couples the secondary optic to the housing,
wherein the housing includes a set of electrical contacts to supply power to the light source, and the primary retention member and the housing including corresponding primary apertures that align to receive a fastener, thereby coupling the primary optic to the housing such that power flows through the electrical contacts to the light source, and
wherein the primary retention member, the secondary retention member, and the housing including corresponding secondary apertures that align to receive a fastener, thereby coupling the secondary optic to both the primary optic and the housing,
wherein the secondary optic is coupled to the housing such that at least a portion of the primary optic is received within a recess of the secondary optic and at least partially enclosed by the secondary optic, the recess delimited by the base portion and the remainder portion.

32. The luminaire of claim 31, further comprising:
a first seal secured between the primary retention member and the primary optic, thereby forming a first liquid impermeable barrier; or
a second seal secured between the housing and the primary optic, thereby forming a second liquid impermeable barrier; or
a third seal secured between the housing and the primary retention member, thereby forming a third liquid impermeable barrier; or any combination of the first seal, the second seal, and the third seal.

33. A luminaire comprising:
a housing having an interior, the housing separating the interior of the housing from an external environment;
a light source at least partially received in the interior of the housing, the light source operable between at least an ON state in which the light source emits light and an OFF state in which the light source does not emit light;
a primary optic coupled to the housing, the primary optic positioned between the light source and the external environment such that at least a portion of the light emitted from the light source passes through the primary optic; and
a secondary optic including a portion shaped as a non-spherical frustum, the non-spherical frustum bounded between a first plane and a second plane that is parallel to the first plane, wherein the secondary optic is securable relative to the primary optic such that at least a portion of the primary optic is at least partially enclosed by the secondary optic and positioned between the first plane and the second plane; and
a trespass shield securable relative to the primary optic such that the trespass shield blocks passage of a portion of the light emitted from the light source that passes through the primary optic, wherein the trespass shield includes a portion shaped as a non-spherical frustum that corresponds to the portion of the secondary optic shaped as a non-spherical frustum.

34. The luminaire of claim 33 wherein the trespass shield is securable relative to the primary optic such that at least a portion of the secondary optic is positioned between the primary optic and the trespass shield.

35. The luminaire of claim 33 wherein the trespass shield includes a plurality of shields that includes at least a first shield and a second shield, each of the plurality of shields being discrete components such that are separately securable relative to the primary optic.

36. The luminaire of claim 33 wherein the light source is a first light source, the primary optic is a first primary optic, the luminaire further comprising:
a second light source at least partially received in the interior of the housing, the second light source operable between at least an ON state in which the second light source emits light and an OFF state in which the second light source does not emit light; and
a second primary optic coupled to the housing, the second primary optic positioned between the second light source and the external environment such that at least a portion of the light emitted from the second light source passes through the primary optic,
wherein the trespass shield blocks passage of both a portion of the light emitted from the first light source that passes through the first primary optic, and a portion of the light emitted from the second light source that passes through the second primary optic.

* * * * *